(12) United States Patent
Matsui et al.

(10) Patent No.: US 7,880,974 B2
(45) Date of Patent: Feb. 1, 2011

(54) ZOOM LENS AND IMAGING APPARATUS

(75) Inventors: Takumi Matsui, Tokyo (JP); Makoto Kanai, Tokyo (JP); Daisuke Kuroda, Kanagawa (JP); Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/659,321

(22) Filed: Mar. 4, 2010

(65) Prior Publication Data

US 2010/0265594 A1    Oct. 21, 2010

(30) Foreign Application Priority Data

Apr. 21, 2009    (JP)    ............... 2009-103145

(51) Int. Cl.
*G02B 15/14* (2006.01)
(52) U.S. Cl. .................. 359/682; 359/680; 359/716; 359/740
(58) Field of Classification Search ................. 359/676, 359/680–685, 716, 740
See application file for complete search history.

(56) References Cited

U.S. PATENT DOCUMENTS

| | | | | |
|---|---|---|---|---|
| 6,809,879 B2 * | 10/2004 | Mihara | ....................... | 359/682 |
| 6,943,960 B2 * | 9/2005 | Ori et al. | ..................... | 359/684 |
| 6,943,962 B2 * | 9/2005 | Sekita | ........................ | 359/682 |
| 6,982,834 B2 * | 1/2006 | Sato | .......................... | 359/682 |
| 6,992,835 B2 * | 1/2006 | Iwasawa et al. | ............ | 359/682 |
| 7,075,733 B2 * | 7/2006 | Itoh | ........................... | 359/680 |
| 7,133,215 B2 * | 11/2006 | Otake | ........................ | 359/680 |
| 7,164,539 B2 * | 1/2007 | Tomioka | .................... | 359/682 |
| 7,212,349 B2 * | 5/2007 | Mitsuki | ..................... | 359/682 |
| 7,215,483 B2 * | 5/2007 | Sekita | ........................ | 359/682 |
| 7,215,484 B2 * | 5/2007 | Yamashita et al. | .......... | 359/682 |
| 7,227,696 B1 * | 6/2007 | Nanba | ........................ | 359/682 |
| 7,310,191 B2 * | 12/2007 | Kurioka | ..................... | 359/682 |
| 7,339,745 B2 * | 3/2008 | Hozumi et al. | ............. | 359/682 |
| 7,362,509 B2 * | 4/2008 | Takeuchi | .................... | 359/680 |
| 7,365,912 B2 * | 4/2008 | Lee | ............................. | 359/680 |
| 7,369,323 B2 * | 5/2008 | Yoshitsugu | ................. | 359/682 |
| 7,453,648 B2 * | 11/2008 | Kurioka et al. | ............. | 359/682 |

(Continued)

FOREIGN PATENT DOCUMENTS

JP    2004-013169 A    1/2004

(Continued)

*Primary Examiner*—Evelyn A. Lester
(74) *Attorney, Agent, or Firm*—Rader, Fishman & Grauer PLLC

(57) ABSTRACT

A zoom lens includes a negative first lens group, a positive second lens group, and a positive third lens group; wherein, when changing power from a wide-angle end state to a tele end state, the first lens group moves such that air space between the first lens group and the second lens group decreases, and air space between the second lens group and the third lens group increases, and the second lens group moves toward the object side; and wherein the first lens group includes a negative lens with both faces formed aspherically and the concave face facing the image side, and a positive meniscus lens with at least one face formed aspherically and the convex face facing the object side, satisfying $$2.8 < |f1/fw| < 3.3$$

where f1 represents the focal length of the first lens group, and fw represents the entire focal length in the wide-angle end state.

5 Claims, 18 Drawing Sheets

U.S. PATENT DOCUMENTS

| | | | |
|---|---|---|---|
| 7,460,311 B2 * | 12/2008 | Sekita | 359/682 |
| 7,570,435 B2 * | 8/2009 | Kurioka et al. | 359/682 |
| 7,697,215 B2 * | 4/2010 | Yoshitsugu | 359/682 |
| 7,729,058 B2 * | 6/2010 | Hozumi et al. | 359/680 |
| 7,800,834 B2 * | 9/2010 | Ori | 359/682 |
| 2003/0099043 A1 * | 5/2003 | Takeuchi et al. | 359/682 |
| 2004/0051961 A1 * | 3/2004 | Itoh | 359/682 |
| 2008/0043341 A1 * | 2/2008 | Ori | 359/682 |

FOREIGN PATENT DOCUMENTS

| | | |
|---|---|---|
| JP | 2006-113554 A | 4/2006 |
| JP | 2007-140359 A | 6/2007 |
| JP | 2007-212636 A | 8/2007 |

* cited by examiner

ZOOM LENS AND IMAGING APPARATUS

BACKGROUND OF THE INVENTION

1. Field of the Invention

The present invention relates to a zoom lens and an imaging apparatus, and particularly relates to a zoom lens which is compact and has a wide field angle so as to be suitably applied to imaging optical systems of digital input/output equipment such as digital video cameras, digital still cameras and the like, as well has having high optical performance, and to an imaging apparatus using this zoom lens.

2. Description of the Related Art

Imaging apparatuses such as digital still cameras, which use solid-state imaging devices, are coming into widespread use. Demand is increasing for even higher image quality with these imaging apparatuses such as digital still cameras. Particularly, with digital still cameras, there is demand for imaging lenses, zoom lens in particular, having excellent imaging performance capable of handling solid-state imaging devices with a great number of pixels.

There is also strong demand for wider field angles as of recent, in addition to the above, such as compact zoom lenses having a high zoom factor and a wide field angle exceeding 38° for the half-angle.

While there are many types of zoom lenses for digital still cameras, including a three-group zoom lens which is suitably used with compact and wide-angle applications. This three-group zoom lens is configured of a first lens group having negative refractive power, a second lens group having positive refractive power, and a third lens group having positive refractive power, in order from the object side. Examples of this three-group zoom lens can be found in Japanese Unexamined Patent Application Publication Nos. 2004-13169, 2006-113554, 2007-212636, and 2007-140359. The arrangement described in Japanese Unexamined Patent Application Publication Nos. 2004-13169 and 2006-113554 realizes a wide angle by configuring the first lens group of three lenses. The arrangement described in Japanese Unexamined Patent Application Publication Nos. 2007-21263.6 and 2007-140359 realizes reduction in size by configuring the first lens group of two lenses.

SUMMARY OF THE INVENTION

However, with the zoom lens described in Japanese Unexamined Patent Application Publication Nos. 2004-13169 and 2006-113554, the first lens group is configured of three lenses, resulting in a thick first lens group. Particularly, there has been a problem in applications to zoom lenses for imaging apparatuses wherein the lens barrel is a collapsible telescopic arrangement, in that the overall length is too long when storing in a collapsed manner to be suitable for reduction in size.

On the other hand, with the zoom lens described in Japanese Unexamined Patent Application Publication No. 2007-212636 the first lens group is configured of two lenses, but the half-angle is 38° or smaller, and the zoom factor is under 3.8, so the demands for wide angle and high zoom factor are not met.

Moreover, with the zoom lens described in Japanese Unexamined Patent Application Publication No. 2007-140359, the first lens group is configured of two lenses, and further distortion can be corrected by image processing, so the number of lenses for correcting the distortion can be reduced, accordingly enabling reduction in size. Still, the half-angle is 38° or smaller, and the zoom factor is under 3.8, so the demands for wide angle and high zoom factor are not met with this zoom lens either.

It has been found desirable to propose a zoom lens realizing a wide field angle with a compact size, and also having high optical performance, and an imaging apparatus having the zoom lens.

According to an embodiment of the present invention, a zoom lens includes: a first lens group having negative refractive power; a second lens group having positive refractive power; and a third lens group having positive refractive power; wherein the first, second, and third lens groups are arranged in that order from the object side; and wherein, at the time of changing power from a wide-angle end state to a tele end state, the first lens group moves such that air space between the first lens group and the second lens group decreases, and air space between the second lens group and the third lens group increases, and the second lens group moves toward the object side; and wherein the first lens group includes two lenses, which are, in order from the object side toward the image side, a negative lens of which both faces are formed aspherically with the concave face facing the image side, and a positive meniscus lens of which at least one face is formed aspherically with the convex face facing the object side, satisfying the following Conditional Expression (1)

$$2.8 < |f1/fw| < 3.3 \tag{1}$$

where f1 represents the focal length of the first lens group, and fw represents the focal length of the entirety in the wide-angle end state.

This Conditional Expression (1) is to stipulate the focal length of the first lens group. A value smaller than the lower limit in Conditional Expression (1) results in the focal length of the first lens group being too small (the power being too strong) and the amount of movement of the second lens group increase when zooming, and consequently the amount of change in aberration increases, making correction of aberration difficult. Also, a value smaller than the lower limit in Conditional Expression (1) results in increased size of the driving mechanism for moving the second lens group, making reduction in size difficult. Further, a value smaller than the lower limit in Conditional Expression (1) results in greater power of the first lens group, the sensitivity to eccentric error relative between the first lens of the first lens group which is a negative lens, and the second lens thereof which is a positive meniscus lens, increases, making manufacturing difficult.

On the other hand, a value greater than the upper limit in Conditional Expression (1) results in the focal length of the first lens group becoming too great, and accordingly the image-forming power of the second and subsequent lens groups becomes small, resulting in a greater length of the overall optical system and a greater diameter of the first lens of the first lens group which is a negative lens, serving as the front lens element, making reduction in size difficult. Increase in size of the diameter of the first lens of the first lens group, which is a negative lens serving as the front lens element, means that the second lens of the first lens group which is the positive meniscus lens will also have to increase in size, resulting in greater difficulty in forming the aspherical faces of the first lens and second lens making up the first lens group, which is undesirable.

Accordingly, satisfying the Conditional Expression (1) can achieve a zoom lens with a reduced length of the overall optical system and a reduced diameter of the front lens element, while realizing a wide field angle and high optical performance.

The zoom lens may satisfy the following Conditional Expressions (2) through (4)

$$1.0 < |f12/f1| < 2.0 \quad (2)$$

$$0.25 < |f11/f12| < 0.45 \quad (3)$$

$$1.0 < D1/fw < 1.6 \quad (4)$$

where f11 represents the focal length of first lens which is the negative lens, f12 represents the focal length of a second lens which is the positive meniscus lens, f1 represents the focal length of the first lens group, D1 represents the thickness of the first lens group on the optical axis, and fw represents the focal length of the entirety in the wide-angle end state.

The Conditional Expression (2) is to stipulate the ratio between the focal length of the second lens of the first lens group which is a positive meniscus lens, and the focal length of the first lens group.

A value smaller than the lower limit in Conditional Expression (2), i.e., a case where the focal length of the second lens which is a positive meniscus lens is too short, results in an increased thickness of the second lens, which is undesirable from the perspective of reduction in thickness of the lens system, and moreover, the aberrations occurring at the second lens increase, leading to increased sensitivity to eccentric error, which is undesirable from a manufacturing perspective as well.

On the other hand, a value greater than the upper limit in Conditional Expression (2), i.e., a case where the focal length of the second lens which is a positive meniscus lens is too long, results in difficulty in performing good aberration correction (particularly, correction of image curvature in the wide-angle end state).

Accordingly, satisfying the Conditional Expression (2) can achieve improved mass-production due to reduced sensitivity to eccentric error, as well as enabling good aberration correction (particularly, correction of image curvature in the wide-angle end state).

The Conditional Expression (3) is to stipulate the ratio between the focal length of the first lens of the first lens group, which is a negative lens, and the focal length of the second lens which is a positive meniscus lens.

A value smaller than the lower limit in Conditional Expression (3) results in excessively great off-axis aberrations, and realizing both correction of astigmatism in the wide-angle end state and correction of spherical aberration in the tele end state becomes difficult, leading to deterioration in optical performance.

On the other hand, a value greater than the upper limit in Conditional Expression (3), i.e., too long a focal length of the first lens of the first lens group which is a negative lens or too short a focal length of the second lens which is a positive meniscus lens, results in the negative focal length of the first lens group being too long, so a wider field angle and reduction in size are not realized together. Particularly, with a collapsible telescopic arrangement of a zoom lens for an imaging apparatus, the length will be long when storing in a collapsed manner, which is disadvantageous in reducing the size of the entire lens system.

Accordingly, satisfying the Conditional Expression (3) allows good correction of aberrations, and correction of aberrations, and also both realization of a wide angle and reduction in size of the entire lens system, can be achieved.

The Conditional Expression (4) is to stipulate the thickness of the first lens group on the optical axis. A value smaller than the lower limit in Conditional Expression (4) results in excessively great off-axis aberrations, and in particular correction of astigmatism in the wide-angle end state becomes difficult, leading to deterioration in optical performance.

On the other hand, a value greater than the upper limit in Conditional Expression (4) results in the thickness of the first lens group becoming great, and with a collapsible telescopic arrangement of a zoom lens for an imaging apparatus, the length will be long when storing in a collapsed manner, which is disadvantageous in reducing the size of the entire lens system.

Accordingly, satisfying the Conditional Expression (4) allows good correction of astigmatism which improves optical performance, and also the size of the entire lens system can be reduced.

Thus, with a zoom lens satisfying the Conditional Expressions (2) through (4), the size thereof can be reduced to a shorter length of the entire optical system, and also optical properties can be improved.

Also, the zoom lens may satisfy the following Conditional Expression (5)

$$0.80 < |\beta_{2T} \sqrt{Zr}| < 1.05 \quad (5)$$

where $\beta_{2T}$ represents the horizontal power in the second lens group in the tele end state, and Zr represents the zoom factor from the wide-angle end state to the tele end state.

The Conditional Expression (5) is to stipulate the horizontal power of the second lens group in the tele end state in accordance with the power of the first lens group determined by Conditional Expression (1). This Conditional Expression (5) stipulates the range of the horizontal power $\beta_{2T}$ of the second lens group in the tele end state.

A value smaller than the lower limit in Conditional Expression (5), i.e., a case wherein the image-forming power of the second lens group is too low in the tele end state, results in inability to shorten the focal length of the first lens group, consequently increasing the length of the entire optical system, and the diameter of the first lens of the first lens group serving as the front lens element, so reduction in size becomes difficult. Increase in size of the diameter of the first lens of the first lens group, which is a negative lens serving as the front lens element, means that the second lens of the first lens group which is the positive meniscus lens will also have to increase in size, resulting in greater difficulty in forming the aspherical faces of the first lens and second lens making up the first lens group, which is undesirable.

On the other hand, a value greater than the upper limit in Conditional Expression (5), i.e., a case wherein the horizontal power of the second lens group is too low in the tele end state, results in increased residual aberration at the first lens group, so obtaining sufficient optical performance becomes difficult. Also, a value greater than the upper limit in Conditional Expression (5) results in increased sensitivity to eccentric error relative between the first lens of the first lens group which is a negative lens, and the second lens thereof which is a positive meniscus lens, making manufacturing difficult.

Accordingly, satisfying the Conditional Expression (5) allows for a zoom lens wherein sufficient optical performance is obtained due to no increase in residual aberration at the first lens group, while reducing the length of the entire optical system and the diameter of the first lens of the first lens group, which is a negative lens serving as the front lens element, thereby realizing reduction in size.

According to the above configuration, a zoom lens includes: a first lens group having negative refractive power; a second lens group having positive refractive power; and a third lens group having positive refractive power; wherein the first, second, and third lens groups are arranged in that order from the object side; and wherein, at the time of changing power from a wide-angle end state to a tele end state, the first lens group moves such that air space between the first lens group and the second lens group decreases, and air space between the second lens group and the third lens group increases, and the second lens group moves toward the object side; and wherein the first lens group includes two lenses, which are, in order from the object side toward the image side, a first lens which is a negative lens of which both faces are formed aspherically with the concave face facing the image side, and a second lens which is a positive meniscus lens of which at least one face is formed aspherically with the convex face facing the object side, satisfying the following Conditional Expression (1)

$$2.8<|f1/fw|<3.3 \tag{1}$$

where f1 represents the focal length of the first lens group, and fw represents the focal length of the entirety in the wide-angle end state. Accordingly, satisfying the Conditional Expression (1) yields a zoom lens wherein the font lens element is as large as possible to realize high optical performance while reducing the length of the entire optical system and the diameter of the front lens element, thereby realizing a zoom lens which is compact and has a wide field angle, and also has high optical performance.

Also, according to the above configuration, the zoom lens satisfies the following Conditional Expressions (2) through (4)

$$1.0<|f12/f1|<2.0 \tag{2}$$

$$0.25<|f11/f12|<0.45 \tag{3}$$

$$1.0<D1/fw<1.6 \tag{4}$$

where f11 represents the focal length of a first lens which is the negative lens, f12 represents the focal length of a second lens which is the positive meniscus lens, f1 represents the focal length of the first lens group, D1 represents the thickness of the first lens group on the optical axis, and fw represents the focal length of the entirety in the wide-angle end state. Accordingly, satisfying the Conditional Expression (2) can achieve improved mass-production due to reduced sensitivity to eccentric error, as well as enabling good aberration correction (particularly, correction of image curvature in the wide-angle end state). Also, satisfying the Conditional Expression (3) allows good correction of aberrations, and also both a side angle and reduction in size of the entire lens system can be achieved at the same time. Further, satisfying the Conditional Expression (4) allows good correction of astigmatism which improves optical performance, and also the size of the entire lens system can be reduced. Thus, with a zoom lens satisfying the Conditional Expressions (2) through (4), the size thereof can be reduced to a shorter length of the entire optical system, and also optical properties can be improved.

Also, according to the above configuration, the zoom lens satisfies the following Conditional Expression (5)

$$0.80<|\beta_{2T}\sqrt{Zr}|<1.05 \tag{5}$$

where $\beta_{2T}$ represents the horizontal power in the second lens group in the tele end state, and Zr represents the zoom factor from the wide-angle end state to the tele end state. Satisfying the Conditional Expression (5) allows for a zoom lens wherein sufficient optical performance is obtained due to no increase in residual aberration at the first lens group, while reducing the length of the entire optical system and the diameter of the first lens of the first lens group serving as the front lens element, thereby realizing reduction in size.

According to an embodiment of the present invention, an imaging apparatus includes: a zoom lens; and an imaging device configured to convert an optical image, formed by the zoom lens, into electrical signals; the zoom lens further including a first lens group having negative refractive power, a second lens group having positive refractive power, and a third lens group having positive refractive power, wherein the first, second, and third lens groups are arranged in that order from the object side; and wherein, at the time of changing power from a wide-angle end state to a tele end state, the first lens group moves such that air space between the first lens group and the second lens group decreases, and air space between the second lens group and the third lens group increases, and the second lens group moves toward the object side; and wherein the first lens group includes two lenses, which are, in order from the object side toward the image side, a negative lens of which both faces are formed aspherically with the concave face facing the image side, and a positive meniscus lens of which at least one face is formed aspherically with the convex face facing the object side, satisfying the following Conditional Expression (1)

$$2.8<|f1/fw|<3.3 \tag{1}$$

where f1 represents the focal length of the first lens group, and fw represents the focal length of the entirety in the wide-angle end state. Satisfying the Conditional Expression (1) can achieve an imaging apparatus with a reduced length of the overall optical system and a reduced diameter of the front lens element, while realizing a wide field angle and high optical performance, thereby realizing an imaging apparatus which is compact and has a wide field angle, and also has high optical performance.

DESCRIPTION OF THE PREFERRED EMBODIMENTS

1. First Embodiment

1-1. Configuration of Zoom Lens

According to a first embodiment of the present invention, a zoom lens includes a first lens group having negative refractive power, a second lens group having positive refractive power, and a third lens group having positive refractive power, in that order from the object side. At the time of changing power from a wide-angle end state to a tele end state, the first lens group moves such that air space between the first lens group and the second lens group decreases, and air space between the second lens group and the third lens group increases, and the second lens group moves toward the object side. The first lens group includes two lenses, which are, in order from the object side toward the image side, a first lens which is a negative lens of which both faces are formed aspherically with the concave face facing the image side, and a second lens which is a positive meniscus lens of which at least one face is formed aspherically with the convex face facing the object side.

With this zoom lens, both faces of the first lens of the first lens group, which is a negative lens, are formed aspherically, so as to correct negative distortion and image curvature which markedly occurs in the wide-angle end state when widening the field angle of the zoom lens. Also, at least one face of the second lens of the first lens group which is a positive meniscus lens is formed aspherically, so as to correct, in a balanced manner, distortion and astigmatism at the wide-angle end state which are not completely corrected by the first lens of the first lens group, which is a negative lens.

Also, with the zoom lens, at least one face of the second lens of the first lens group which is a positive meniscus lens is formed aspherically, so as to correct spherical aberration well, occurring at a tele end state in the case of a great zoom factor. Accordingly, good aberration correction can be obtained even with a first lens group configured of two lenses, and particularly, with a collapsible telescopic arrangement of a zoom lens for an imaging apparatus, the overall length when storing in a collapsed manner can be reduced.

Figure 1:
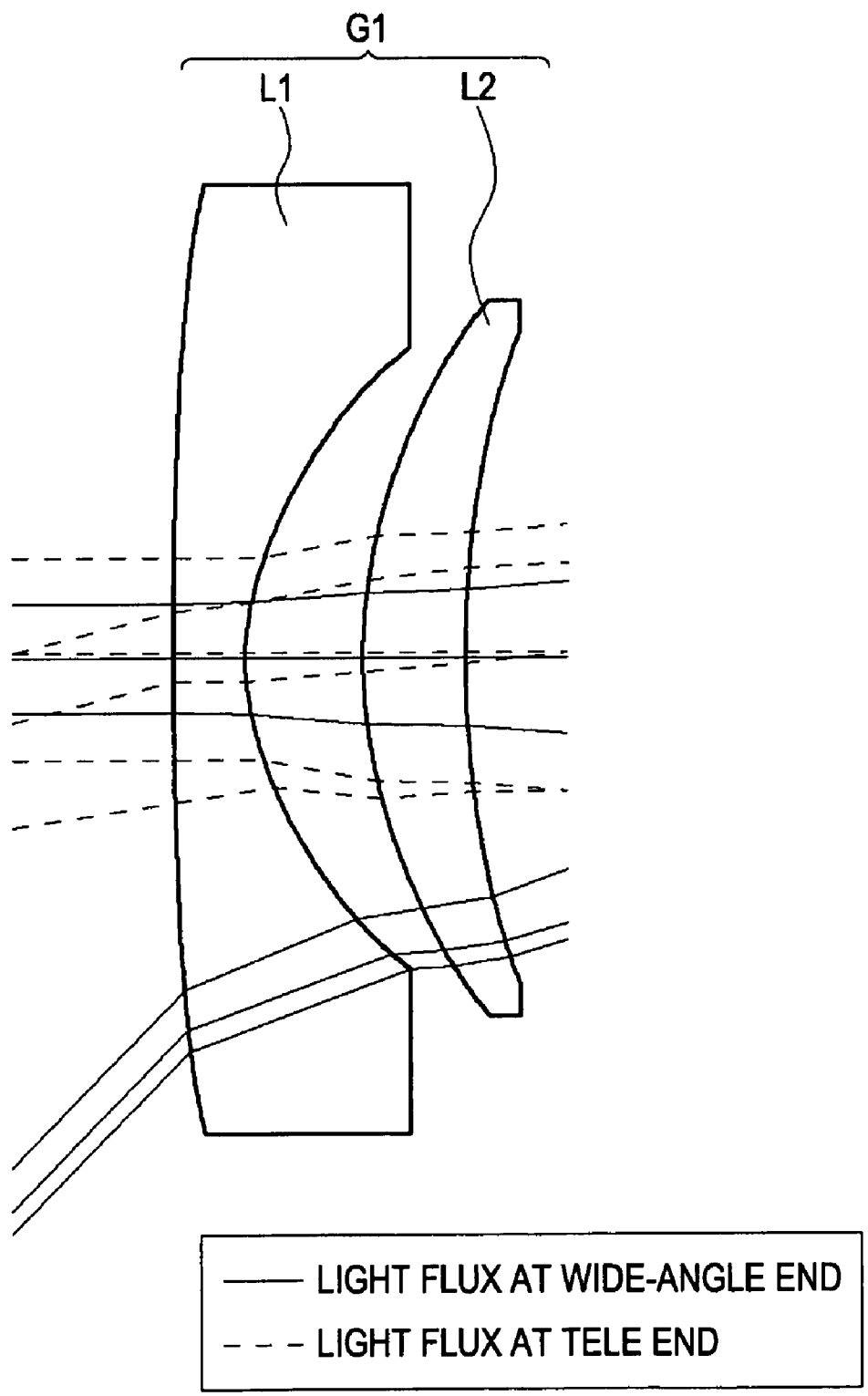
FIG. 1 is a schematic line drawing for describing the state of light fluxes input to a first lens group.

Also, with the zoom lens, an aspheric face is preferably formed on the object side face of the second lens of the first lens group, which is a positive meniscus lens. That is to say, with the zoom lens having a three-group negative-positive-positive configuration, as shown in FIG. 1, both faces of a first lens L1 which is the negative lens, at the portion where the peripheral light flux at the wide-angle end side and the peripheral light flux at the tele end side are farthest from each other, are formed aspherically, and an aspheric face is formed on the object side face of a second lens L2 which is a positive meniscus lens, whereby an air lens created between the first lens L1 and the second lens L2 is aspherical.

This allows the zoom lens to have a greatly differing lens curvature radius at the center and approximative lens curvature radius at the perimeter, which has been unachievable with spherical lenses, consequently enabling effective correction of distortion in the wide-angle end state and spherical aberration in the tele end state, thereby enabling reduction in size and higher power of the entire first lens group to be achieved.

Also, the zoom lens preferably satisfies the following Conditional Expression (1)

$$2.8<|f1/fw|<3.3 \tag{1}$$

where f1 represents the focal length of the first lens group, and fw represents the focal length of the entirety in the wide-angle end state.

This Conditional Expression (1) is to stipulate the focal length of the first lens group, with a value smaller than the lower limit in Conditional Expression (1) resulting in the focal length of the first lens group being too small (the power being too strong) and the amount of movement of the second lens group increase when zooming, and consequently the amount of change in aberration increases, making correction of aberration difficult. Also, a value smaller than the lower limit in Conditional Expression (1) results in increased size of the driving mechanism for moving the second lens group, making reduction in size difficult. Further, a value smaller than the lower limit in Conditional Expression (1) results in greater power of the first lens group, the sensitivity to eccentric error relative between the first lens of the first lens group which is a negative lens, and the second lens thereof which is a positive meniscus lens, increases, making manufacturing difficult.

On the other hand, a value greater than the upper limit in Conditional Expression (1) results in the focal length of the first lens group becoming too great, and accordingly the image-forming power of the second and subsequent lens groups becomes small, resulting in a greater length of the overall optical system and a greater diameter of the first lens of the first lens group which is a negative lens, serving as the front lens element, making reduction in size difficult. Increase in size of the diameter of the first lens of the first lens group serving as the front lens element means that the second lens of the first lens group which is the positive meniscus lens will also have to increase in size, resulting in greater difficulty in forming the aspherical faces of the first lens and second lens making up the first lens group, which is undesirable.

Accordingly, satisfying the Conditional Expression (1) can achieve a zoom lens with a reduced length of the overall optical system and a reduced diameter of the front lens element, while realizing a wide field angle and high optical performance.

The zoom lens is configured so as to satisfy the following Conditional Expressions (2) through (4)

$$1.0<|f2/f1|<2.0 \tag{2}$$

$$0.25<|f11/f12|<0.45 \tag{3}$$

$$1.0<D1/fw<1.6 \tag{4}$$

where f11 represents the focal length of a first lens which is the negative lens, f12 represents the focal length of a second lens which is the positive meniscus lens, f1 represents the focal length of the first lens group, D1 represents the thickness of the first lens group on the optical axis, and fw represents the focal length in the wide-angle end state.

The Conditional Expression (2) is to stipulate the ratio between the focal length of the second lens of the first lens group which is a positive meniscus lens, and the focal length of the first lens group.

A value smaller than the lower limit in Conditional Expression (2), i.e., a case where the focal length of the second lens which is a positive meniscus lens is too short, results in an increased thickness of the second lens, which is undesirable from the perspective of reduction in thickness of the lens system, and moreover, the aberrations occurring at the second lens increase, leading to increased sensitivity to eccentric error, which is undesirable from a mass-production perspective as well.

On the other hand, a value greater than the upper limit in Conditional Expression (2), i.e., a case where the focal length of the second lens which is a positive meniscus lens is too long, results in difficulty in performing good aberration correction (particularly, correction of image curvature in the wide-angle end state).

Accordingly, satisfying the Conditional Expression (2) can achieve improved mass-production due to reduced sensitivity to eccentric error, as well as enabling good aberration correction (particularly, correction of image curvature in the wide-angle end state).

The Conditional Expression (3) is to stipulate the ratio between the focal length of the first lens of the first lens group, which is a negative lens, and the focal length of the second lens which is a positive meniscus lens.

A value smaller than the lower limit in Conditional Expression (3) results in excessively great off-axis aberrations, and realizing both correction of astigmatism in the wide-angle end state and correction of spherical aberration in the tele end state becomes difficult, leading to deterioration in optical performance.

On the other hand, a value greater than the upper limit in Conditional Expression (3), i.e., too long a focal length of the first lens of the first lens group which is a negative lens or too short a focal length of the second lens which is a positive meniscus lens, results in the negative focal length of the first lens group being too long, so a wider field angle and reduction in size are not realized together. Particularly, with a collapsible telescopic arrangement of a zoom lens for an imaging apparatus, of the thickness of the first lens group is too great, the length will be long when storing in a collapsed manner, which is disadvantageous in reducing the size of the entire lens system.

Accordingly, satisfying the Conditional Expression (3) allows good correction of aberrations, and both a wide field angle and reduction in size of the entire lens system be achieved at the same time.

The Conditional Expression (4) is to stipulate the thickness of the first lens group on the optical axis. A value smaller than the lower limit in Conditional Expression (4) results in excessively great off-axis aberrations, and in particular correction of astigmatism in the wide-angle end state becomes difficult, leading to deterioration in optical performance.

On the other hand, a value greater than the upper limit in Conditional Expression (4) results in the thickness of the first lens group becoming great, and with a collapsible telescopic arrangement of a zoom lens for an imaging apparatus, the length will be long when storing in a collapsed manner, which is disadvantageous in reducing the size of the entire lens system.

Accordingly, satisfying the Conditional Expression (4) allows good correction of astigmatism which improves optical performance, and also the size of the entire lens system can be reduced.

Thus, with a zoom lens satisfying the Conditional Expressions (2) through (4), the size thereof can be reduced to a shorter length of the entire optical system, and also optical performance can be improved.

Further, the zoom lens is configured so as to satisfy the following Conditional Expression (5)

$$0.80<|\beta_{2T}\sqrt{Zr}|<1.05 \qquad (5)$$

where $\beta_{2T}$ represents the horizontal power in the second lens group in the tele end state, and Zr represents the zoom factor from the wide-angle end state to the tele end state.

The Conditional Expression (5) is to stipulate the horizontal power of the second lens group in the tele end state in accordance with the power of the first lens group determined by Conditional Expression (1).

A value smaller than the lower limit in Conditional Expression (5), i.e., a case wherein the image-forming power of the second lens group is too low in the tele end state, results in inability to shorten the focal length of the first lens group, consequently increasing the length of the entire optical system, and the diameter of the first lens of the first lens group serving as the front lens element, so reduction in size becomes difficult. Increase in size of the diameter of the first lens of the first lens group, which is a negative lens serving as the front lens element, means that the second lens of the first lens group which is the positive meniscus lens will also have to increase in size, resulting in greater difficulty in forming the aspherical faces of the first lens which is a negative lens and the second lens which is a positive meniscus lens, which is undesirable.

On the other hand, a value greater than the upper limit in Conditional Expression (5), i.e., a case wherein the horizontal power of the second lens group is too low in the tele end state, results in increased residual aberration at the first lens group, so obtaining sufficient optical performance becomes difficult. Also, a value greater than the upper limit in Conditional Expression (5) results in increased sensitivity to eccentric error relative between the first lens of the first lens group which is a negative lens, and the second lens thereof which is a positive meniscus lens, making manufacturing difficult.

Accordingly, satisfying the Conditional Expression (5) allows for a zoom lens wherein sufficient optical performance is obtained due to no increase in residual aberration at the first lens group, while reducing the length of the entire optical system and the diameter of the first lens of the first lens group serving as the front lens element, thereby realizing reduction in size.

With the zoom lens according the present embodiment, the second lens group is preferably a cemented lens configured of, in order from the object side toward the image side, a third lens which is a positive lens with the convex face facing the object side, a fourth lens which is a positive lens with the convex face facing the object side, and a fifth lens which is a negative lens with the concave face facing the image side.

This configuration allows the zoom lens to have the second lens group formed of just three lenses, thereby allowing the length when storing in a collapsed manner to be reduced, and also allowing the front principal point of the second lens group to be situated at the object side, which is advantageous in reducing the overall length of the optical system.

Also, with the zoom lens, the face of the second lens group which is closest to the object side is formed aspherically, whereby spherical aberration and comatic aberration can be corrected well.

Further, with the zoom lens, an image can be shifted by moving (shifting) one of the first through third lens groups, or a part of one lens group thereof, in a direction generally perpendicular to the optical axis. Thus, the zoom lens can function as a shake-resistant optical system by being provided with a combination of a detection system for detecting image blurring which occurs in the event of moving one lens group or a part of one lens group in a direction generally perpendicular to the optical axis, a driving system for moving the first through third lens groups, and a control system for providing the driving system with a shift amount based on the output of the detection system, at the time of moving. Particularly, shifting the entire second lens group in a direction generally perpendicular to the optical axis enables an image to be shifted with less change in aberration.

Also, with the zoom lens, focusing is preferably performed by moving the first lens group or third lens group in the optical axis direction. Particularly, using the third lens group as a lens group for focusing facilitates avoiding interference with the driving system for performing driving control of the shutter unit or iris unit, and the shake-resistant driving system for moving one of the first through third lens groups in a direction generally perpendicular to the optical axis, thereby realizing reduction in size.

2. Numerical Embodiments

Next, numerical embodiments wherein specific numerical values have been applied to the zoom lens described above will be described with reference to the drawings and tables.

Some of the lenses used in the following numerical embodiments have lens faces formed aspherically. An aspherical face can be defined with the following Expression (1)

$$x = cy^2/(1+(1-(1+K) \cdot c^2 y^2)^{1/2}) + \Sigma A_i \cdot Y^i \quad (1)$$

where x represents the distance from the vertex of the lens face in the direction of the optical axis, y represents the height in the direction perpendicular to the optical axis, c represents the paraxial curvature at the lens vertex, K represents the conic constant, and Ai represents an aspherical coefficient of the i'th order.

2-1. First Numerical Embodiment

Figure 2:
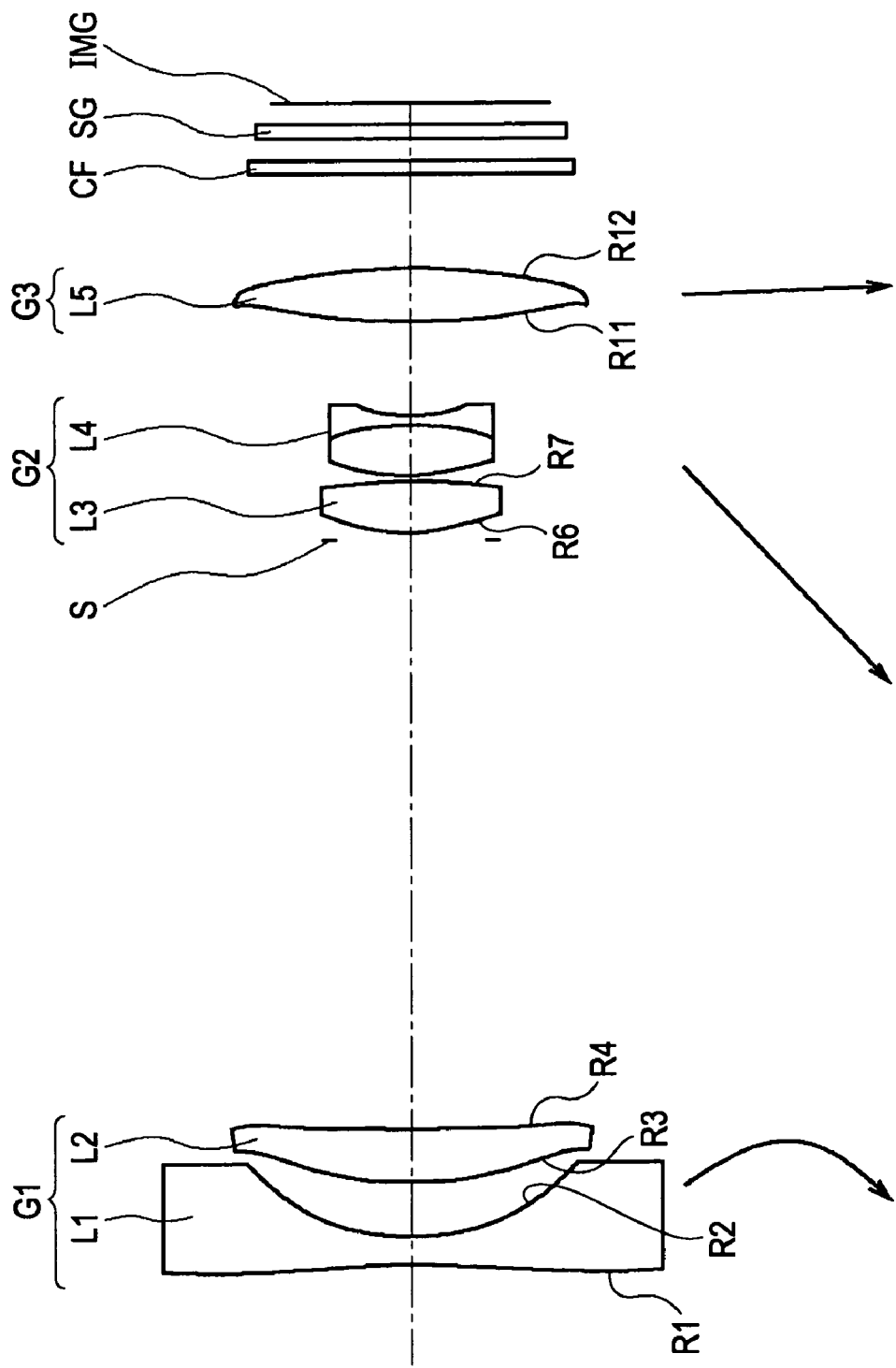
FIG. 2 is a schematic cross-sectional line drawing illustrating the configuration of a zoom lens according to a Numerical Embodiment 1.

In FIG. 2, reference numeral 1 denotes a zoom lens according to the First Numerical Embodiment, configured of a first lens group G1 having negative refractive power, a second lens group G2 having positive refractive power, and a third lens group G3 having positive refractive power, in that order from the object side.

The zoom lens 1 is configured such that, at the time of changing power from the wide-angle end state to the tele end state, the first lens group G1 moves such that air space between the first lens group G1 and the second lens group G2 decreases, and air space between the second lens group G2 and the third lens group G3 increases, and the second lens group G2 moves toward the object side.

The first lens group G1 includes, in order from the object side toward the image side, a first lens L1 which is a biconcave lens of which both faces are formed aspherically, and a second lens L2 which is a positive meniscus lens of which the face facing the object side is formed aspherically, with the convex face facing the object side.

The second lens group G2 includes, in order from the object side, a third lens L3 which is a biconvex lens of which both faces are formed aspherically, and a fourth lens. L4 which is a cemented lens of a biconvex lens and a biconcave lens. The third lens group G3 is configured of a fifth lens L5 which is a biconvex lens of which both faces are formed aspherically.

With the zoom lens 1, an aperture diaphragm S is positioned nearby the second lens group G2, at the object side thereof, and a cut filter CF and seal glass SG are positioned between the third lens group G3 and the image plane IMG.

Tables 1 through 3 give the values of the First Numerical Embodiment of the present invention. Note that of the values for the First Numerical Embodiment, Fno is the F-number, f is the focal length, and ω is the half-angle. Also, Face No. is a face No. indicating which face in order from the object side toward the image side, R is the paraxial curvature radius corresponding to Face No., and D is the interfacial spacing on the axis between a face corresponding to Face No. and the face adjacent thereto. Further, nd is the d line refractive index of the material making up the lens having the face corresponding to Face No., and vd is the d line Abbe's number of the material making up the lens having the face corresponding to Face No. Moreover, "ASP" means that the face is aspherical, and "INF" means that the curvature of the face is infinite.

TABLE 1

| Face No. | R | D | Nd | vd |
|---|---|---|---|---|
| 1 | −51.514 (ASP) | 1.050 | 1.85135 | 40.1 |
| 2 | 7.311 (ASP) | 1.850 | | |
| 3 | 14.569 (ASP) | 1.800 | 2.00178 | 19.3 |
| 4 | 52.197 (ASP) | D4 | | |
| 5 | Aperture | 0.000 | | |
| 6 | 5.482 (ASP) | 1.650 | 1.62263 | 58.2 |
| 7 | −21.626 (ASP) | 0.150 | | |
| 8 | 9.266 | 1.400 | 1.81600 | 46.6 |
| 9 | −13.371 | 0.400 | 1.69895 | 30.1 |
| 10 | 3.594 | D10 | | |
| 11 | 27.271 (ASP) | 1.620 | 1.69350 | 53.2 |
| 12 | −16.772 (ASP) | D12 | | |
| 13 | INF | 0.400 | 1.51872 | 64.2 |
| 14 | INF | 0.500 | | |
| 15 | INF | 0.500 | 1.51872 | 64.2 |
| 16 | INF | 0.500 | | |

With the zoom lens 1, the object side face of the first lens L1 of the first lens group G1 (R1), the image side face of the first lens L1 (R2), the object side face of the second lens L2 of the first lens group G1 (R3), the image side face of the second lens L2 (R4), the object side face of the third lens L3 of the second lens group G2 (R6), the image side face of the third lens L3 (R7), the object side face of the fifth lens L5 of the third lens group G3 (R11), and the image side face of the fifth lens L5 (R12), are formed aspherically.

The 4th order, 6th order, 8th order, and 10th order aspherical coefficients A4, A6, A8, and A10 of the aspheric surfaces of the zoom lens 1 are shown in Table 2 along with their conical constants K. Here, the term "E-i" is an exponential notation with a base of 10, i.e., $10^{-i}$, so "0.12345E-05" would represent "$0.12345 \times 10^{-5}$".

TABLE 2

| Face No. | K | A4 | A6 | A8 | A10 |
|---|---|---|---|---|---|
| 1 | −1.02254E+01 | −1.56066E−05 | 6.42187E−06 | −1.06845E−07 | 5.41283E−10 |
| 2 | −2.58984E−01 | −4.17130E−04 | 3.01724E−05 | −7.88384E−07 | 8.90800E−09 |
| 3 | 1.53691E+00 | −4.06069E−04 | 2.24365E−05 | −5.97089E−07 | 2.85929E−09 |
| 4 | 1.52332E+01 | −3.27571E−04 | 1.76667E−05 | −4.47498E−07 | 3.63841E−10 |
| 6 | 7.58226E−01 | −1.63768E−03 | −7.24417E−05 | −6.04254E−07 | −8.31043E−07 |
| 7 | −1.99931E+01 | −2.51021E−04 | −3.27509E−05 | −3.27582E−06 | −3.59466E−07 |
| 11 | 1.37067E+01 | 2.57947E−04 | −3.59043E−05 | 1.88656E−06 | −4.07037E−08 |
| 12 | 8.81362E+00 | 1.06610E−03 | −3.49601E−05 | 1.41870E−06 | −1.61585E−08 |

With the zoom lens 1, the interfacial spacing D4 between the first lens group G1 and the diaphragm S, the interfacial spacing D10 between the second lens group G2 and the third lens group G3, and the interfacial spacing D12 between the third lens group G3 and the cut filter CF, change at the time of changing power between the wide-angle end state and the tele end state.

Table 3 shows the variable spacing for each interfacial spacing in the First Numerical Embodiment at the wide-angle end state (focal length f=4.30), intermediate focal length state (focal length f=9.60), and the tele end state (focal length f=21.50), along with the F-numbers Fno and half-angles ω thereof.

TABLE 3

|  | Fno |  |  |
|---|---|---|---|
|  | 2.42 | 3.60 | 6.22 |
| f | 4.30 | 9.60 | 21.50 |
| ω | 43.64 | 22.11 | 10.28 |
| D4 | 17.738 | 5.804 | 0.300 |
| D10 | 3.672 | 10.231 | 22.799 |
| D12 | 2.959 | 2.446 | 1.500 |

Thus, the zoom lens 1 according to the First Numerical Embodiment achieves a zoom factor of 5 with a half-angle of 43° or greater, thereby realizing wide angle and high zoom power.

Figure 3:
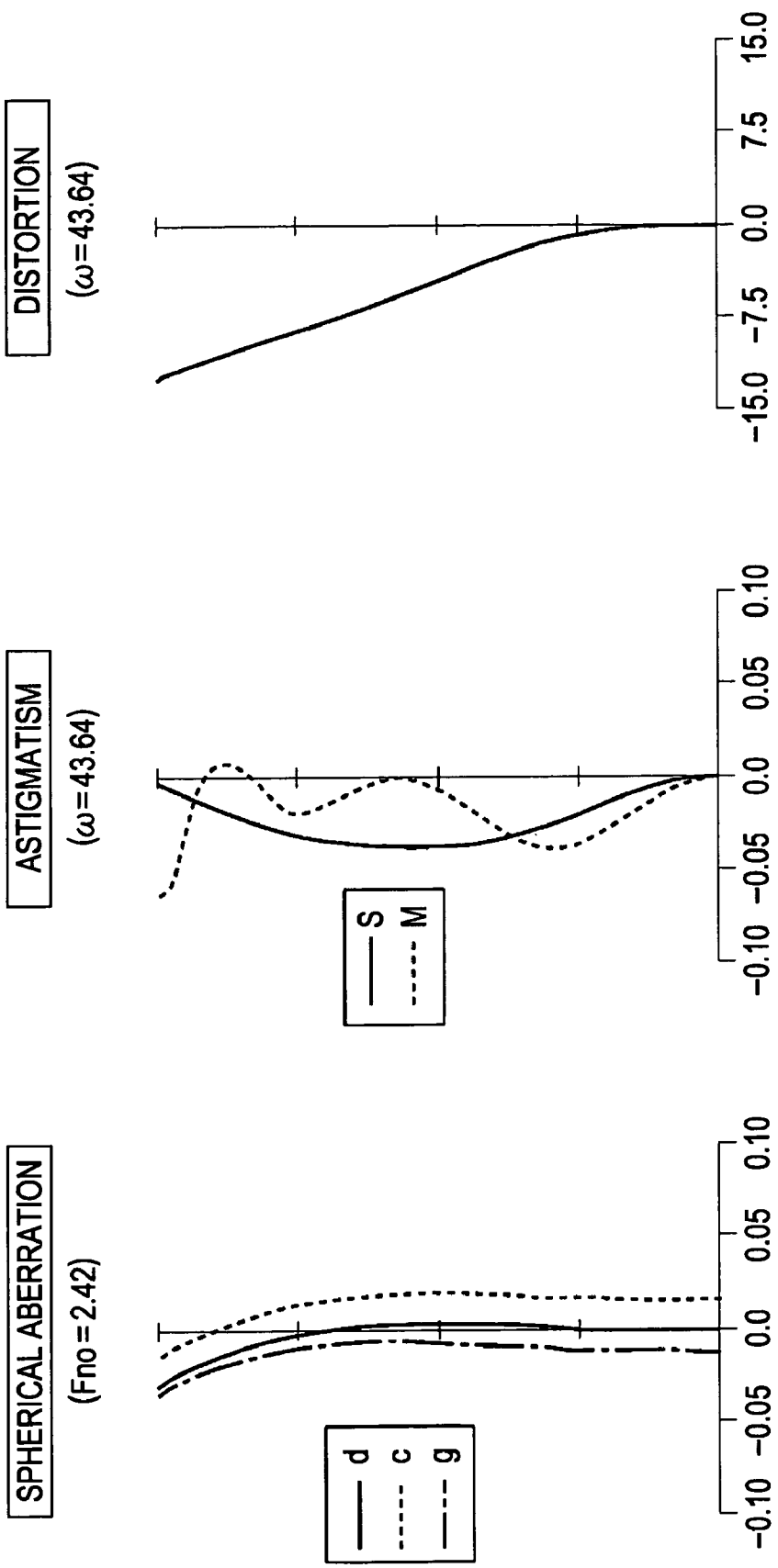
FIG. 3 shows property curves illustrating aberrations in a wide-angle end state according to the Numerical Embodiment 1.
Figure 4:
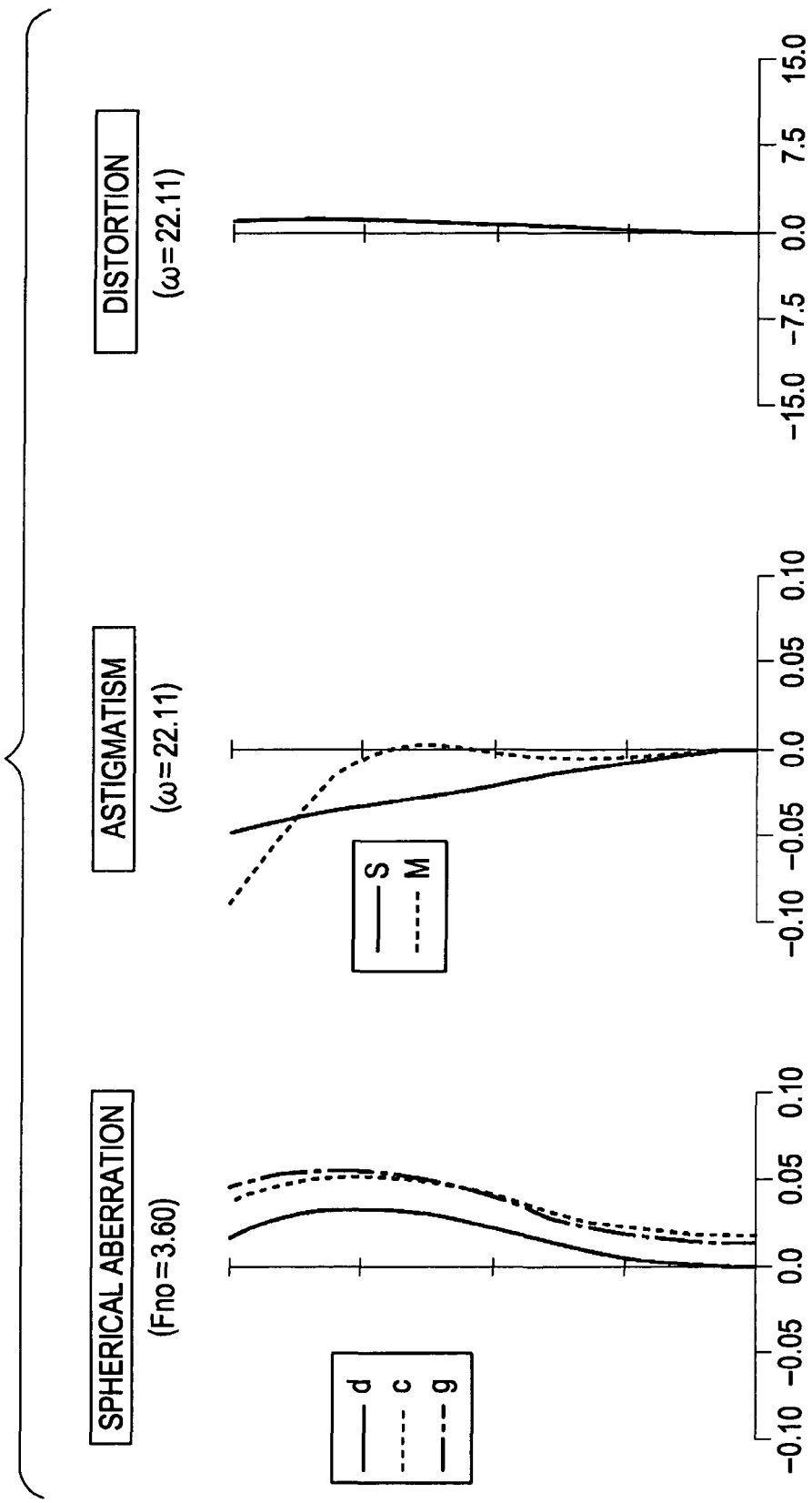
FIG. 4 shows property curves illustrating aberrations in an intermediate focal length state according to the Numerical Embodiment 1.
Figure 5:
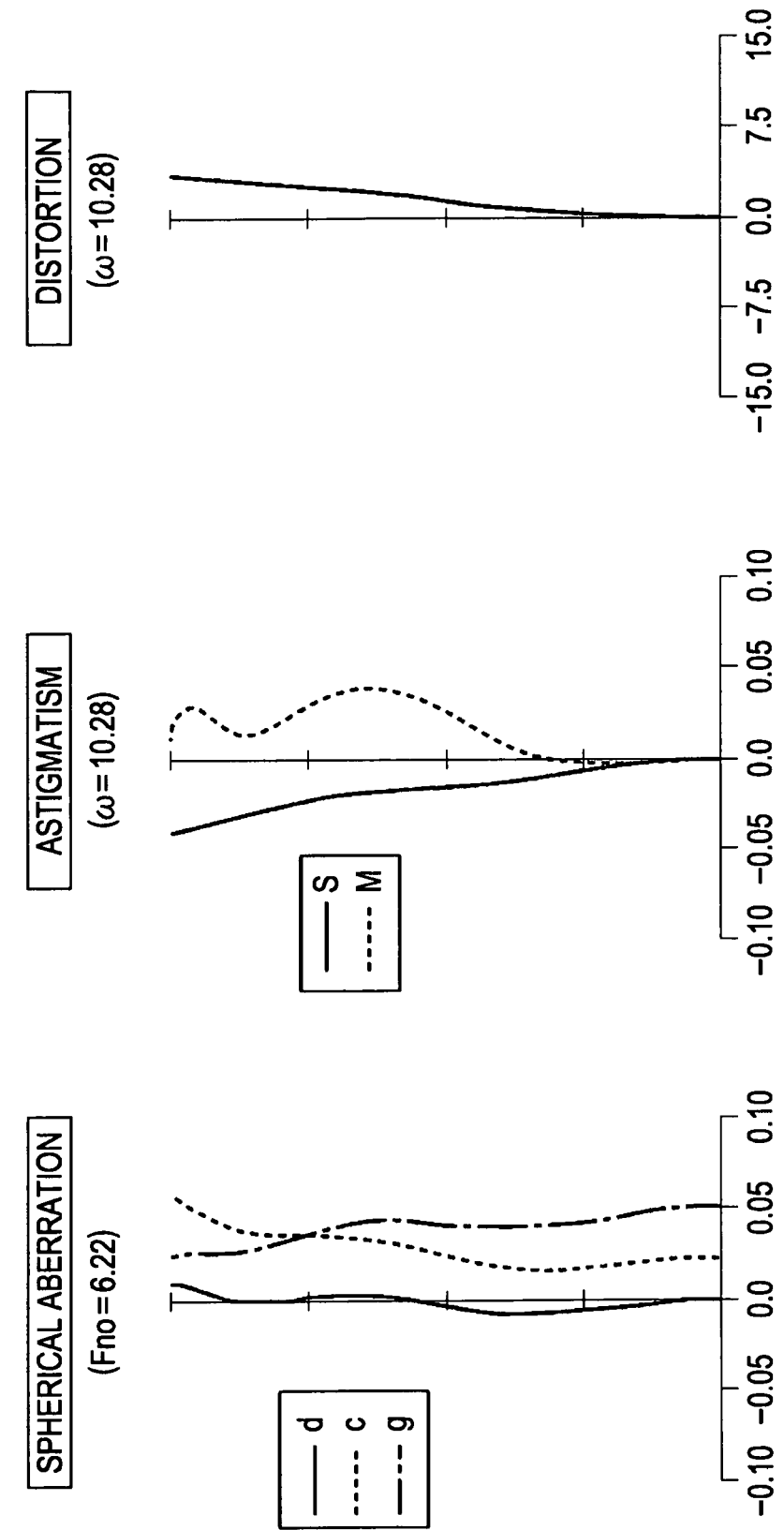
FIG. 5 shows property curves illustrating aberrations in a tele end state according to the Numerical Embodiment 1.

Next, FIG. 3 shows diagrams of aberrations at the wide-angle end state (f=4.30) with the zoom lens 1 according to the First Numerical Embodiment focused on infinity, FIG. 4 shows diagrams of aberrations at the intermediate focal length state (f=9.60), and FIG. 5 shows diagrams of aberrations at the tele end state (f=21.50). In FIGS. 3 through 5, the spherical aberration diagrams illustrate d line (wavelength 587.6 nm) values with solid lines, c line (wavelength 656.3 nm) values with dotted lines, and g line (wavelength 435.8 nm) values with dash-dotted lines.

Also, in FIGS. 3 through 5, the astigmatism diagrams show sagittal image plane values with solid lines, and meridional image plane values with dotted lines. As can be seen from the aberration diagrams, with the zoom lens 1 according to the First Numerical Embodiment, aberrations are corrected well from the wide-angle end state to the tele end state, exhibiting excellent image-forming performance.

2-2. Second Numerical Embodiment

Figure 6:
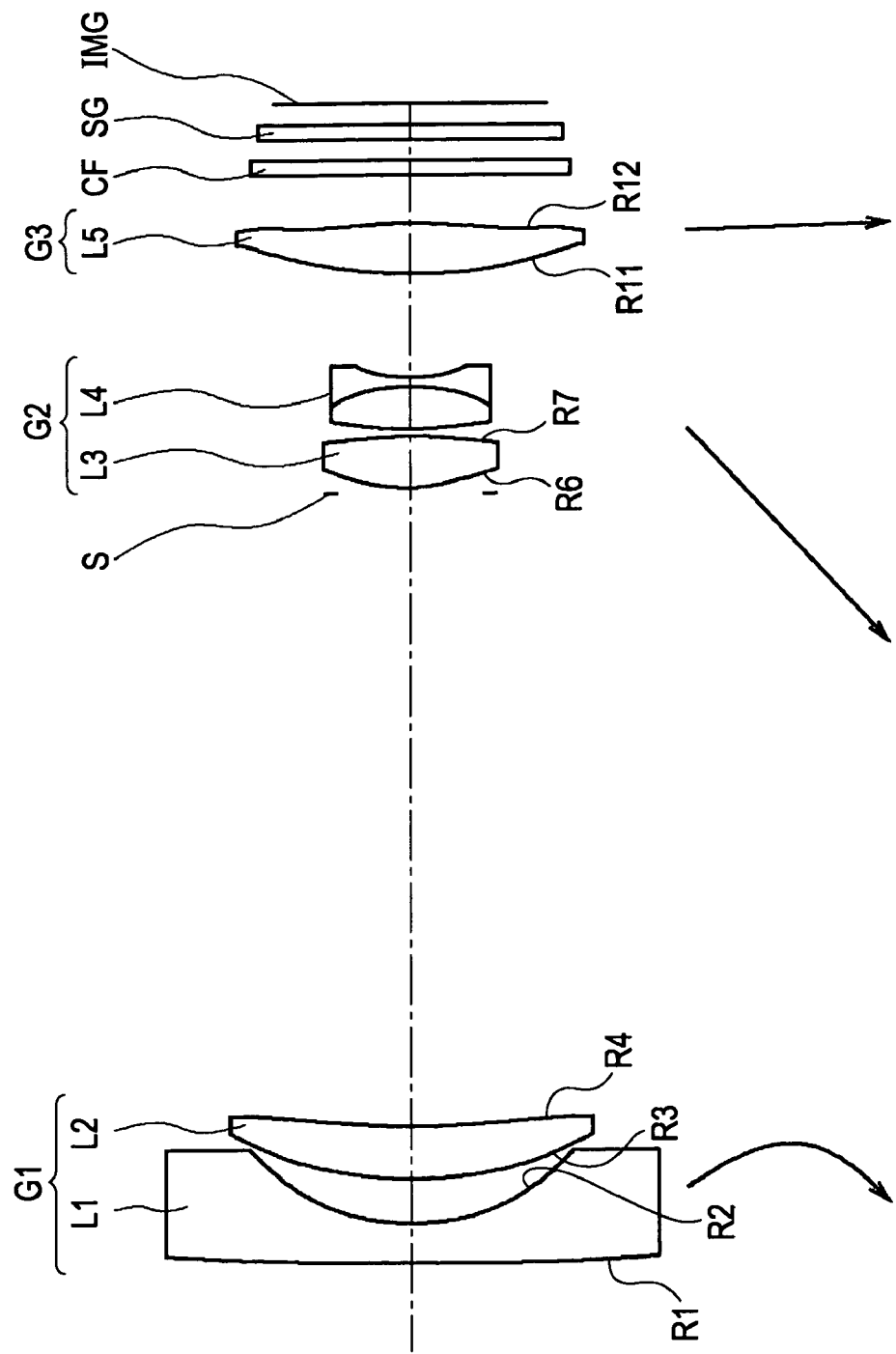
FIG. 6 is a schematic cross-sectional line drawing illustrating the configuration of a zoom lens according to a Numerical Embodiment 2.

In FIG. 6, reference numeral 2 denotes a zoom lens according to the Second Numerical Embodiment, configured overall of a first lens group G1 having negative refractive power, a second lens group G2 having positive refractive power, and a third lens group G3 having positive refractive power, in that order from the object side.

The zoom lens 2 is configured such that, at the time of changing power from the wide-angle end state to the tele end state, the first lens group G1 moves such that air space between the first lens group G1 and the second lens group G2 decreases, and air space between the second lens group G2 and the third lens group G3 increases, and the second lens group G2 moves toward the object side.

The first lens group G1 includes, in order from the object side toward the image side, a first lens L1 which is a biconcave lens of which both faces are formed aspherically, and a second lens L2 which is a positive meniscus lens of which the face facing the object side is formed aspherically, with the convex face facing the object side.

The second lens group G2 includes, in order from the object side, a third lens L3 which is a biconvex lens of which both faces are formed aspherically, and a fourth lens L4 which is a cemented lens of a biconvex lens and a biconcave lens. The third lens group G3 is configured of a fifth lens L5 which is a biconvex lens of which both faces are formed aspherically.

With the zoom lens 2, an aperture diaphragm is positioned nearby the second lens group G2, at the object side thereof, and a cut filter CF and seal glass SG are positioned between the third lens group G3 and the image plane IMG.

Tables 4 through 6 give the values of the Second Numerical Embodiment of the present invention. Note that of the values for the Second Numerical Embodiment, Fno is the F-number, f is the focal length, and ω is the half-angle. Also, Face No. is a face No. indicating which face in order from the object side toward the image side, R is the paraxial curvature radius corresponding to Face No., and D is the interfacial spacing on the axis between a face corresponding to Face No. and the face adjacent thereto. Further, nd is the d line refractive index of the material making up the lens having the face corresponding to Face No., and vd is the d line Abbe's number of the material making up the lens having the face corresponding to Face No. Moreover, "ASP" means that the face is aspherical, and "INF" means that the curvature of the face is infinite.

TABLE 4

| Face No. | R | D | Nd | vd |
|---|---|---|---|---|
| 1 | −215.883 (ASP) | 1.000 | 1.85135 | 40.1 |
| 2 | 6.599 (ASP) | 1.850 |  |  |
| 3 | 13.384 (ASP) | 1.800 | 2.00170 | 20.6 |
| 4 | 36.617 (ASP) | D4 |  |  |
| 5 | Aperture | 0.000 |  |  |
| 6 | 6.4363 (ASP) | 1.650 | 1.7725 | 49.6 |
| 7 | −17.3755 (ASP) | 0.150 |  |  |
| 8 | 14.3526 | 1.400 | 1.85134 | 40.1 |
| 9 | −17.3755 | 0.400 | 1.71736 | 29.5 |
| 10 | 14.3526 | D10 |  |  |
| 11 | −5.000 (ASP) | 1.620 | 1.69350 | 53.2 |
| 12 | 3.7099 (ASP) | D12 |  |  |
| 13 | INF | 0.400 | 1.51872 | 64.2 |

TABLE 4-continued

| Face No. | R | D | Nd | vd |
|---|---|---|---|---|
| 14 | INF | 0.500 | | |
| 15 | INF | 0.500 | 1.51872 | 64.2 |
| 16 | INF | 0.500 | | |

With the zoom lens 2, the object side face of the first lens L1 of the first lens group G1 (R1), the image side face of the first lens L1 (R2), the object side face of the second lens L2 of the first lens group G1 (R3), the image side face of the second lens L2 (R4), the object side face of the third lens L3 of the second lens group G2 (R6), the image side face of the third lens L3 (R7), the object side face of the fifth lens L5 of the third lens group G3 (R11), and the image side face of the fifth lens L5 (R12), are formed aspherically.

The 4th order, 6th order, 8th order, and 10th order aspherical coefficients A4, A6, A8, and A10 of the aspheric surfaces of the zoom lens 2 are shown in Table 5 along with their conical constants K. Here, the term "E-i" is an exponential notation with a base of 10, i.e., $10^{-i}$, so "0.12345E-05" would represent "$0.12345 \times 10^{-5}$".

TABLE 5

| Face No. | K | A4 | A6 | A8 | A10 |
|---|---|---|---|---|---|
| 1 | 0.00000E+00 | −1.53195E+00 | 7.91762E−05 | 3.99881E−06 | −1.17557E−07 |
| 2 | 0.00000E+00 | 4.50366E−02 | −4.46338E−04 | 4.15385E−05 | −1.42395E−06 |
| 3 | 0.00000E+00 | 2.57312E+00 | −5.34676E−04 | 2.95149E−05 | −7.32883E−07 |
| 4 | 0.00000E+00 | −1.24400E+01 | −3.72573E−04 | 2.19501E−05 | −3.44114E−07 |
| 6 | −2.57694E+00 | 6.08442E−01 | −1.75282E−03 | −9.32737E−05 | −1.68669E−06 |
| 7 | 4.18532E+00 | −4.58237E+00 | −4.34872E−04 | −8.54696E−05 | −1.58341E−06 |
| 11 | 0.00000E+00 | −1.08065E+01 | 5.46303E−04 | −1.61165E−05 | 2.46122E−06 |
| 12 | 0.00000E+00 | 1.98916E+01 | 4.23016E−04 | −6.25694E−06 | 2.47747E−06 |

With the zoom lens 2, the interfacial spacing D4 between the first lens group G1 and the diaphragm S, the interfacial spacing D10 between the second lens group G2 and the third lens group G3, and the interfacial spacing D12 between the third lens group G3 and the cut filter CF, change at the time of changing power between the wide-angle end state and the tele end state.

Table 6 shows the variable spacing for each interfacial spacing in the Second Numerical Embodiment at the wide-angle end state (focal length f=4.30), intermediate focal length state (focal length f=8.60), and the tele end state (focal length f=17.20), along with the F-numbers Fno and half-angles ω thereof.

TABLE 6

| | Fno | | |
|---|---|---|---|
| | 2.63 | 3.59 | 5.65 |
| f | 4.30 | 8.60 | 17.20 |
| ω | 43.6° | 24.4° | 12.8° |
| D4 | 15.432 | 5.112 | 0.300 |
| D10 | 3.695 | 8.248 | 17.453 |
| D12 | 1.401 | 1.349 | 0.500 |

Thus, the zoom lens 2 according to the Second Numerical Embodiment achieves a zoom factor of 4 with a half-angle of 43° or greater, thereby realizing wide angle and high zoom power.

Figure 7:
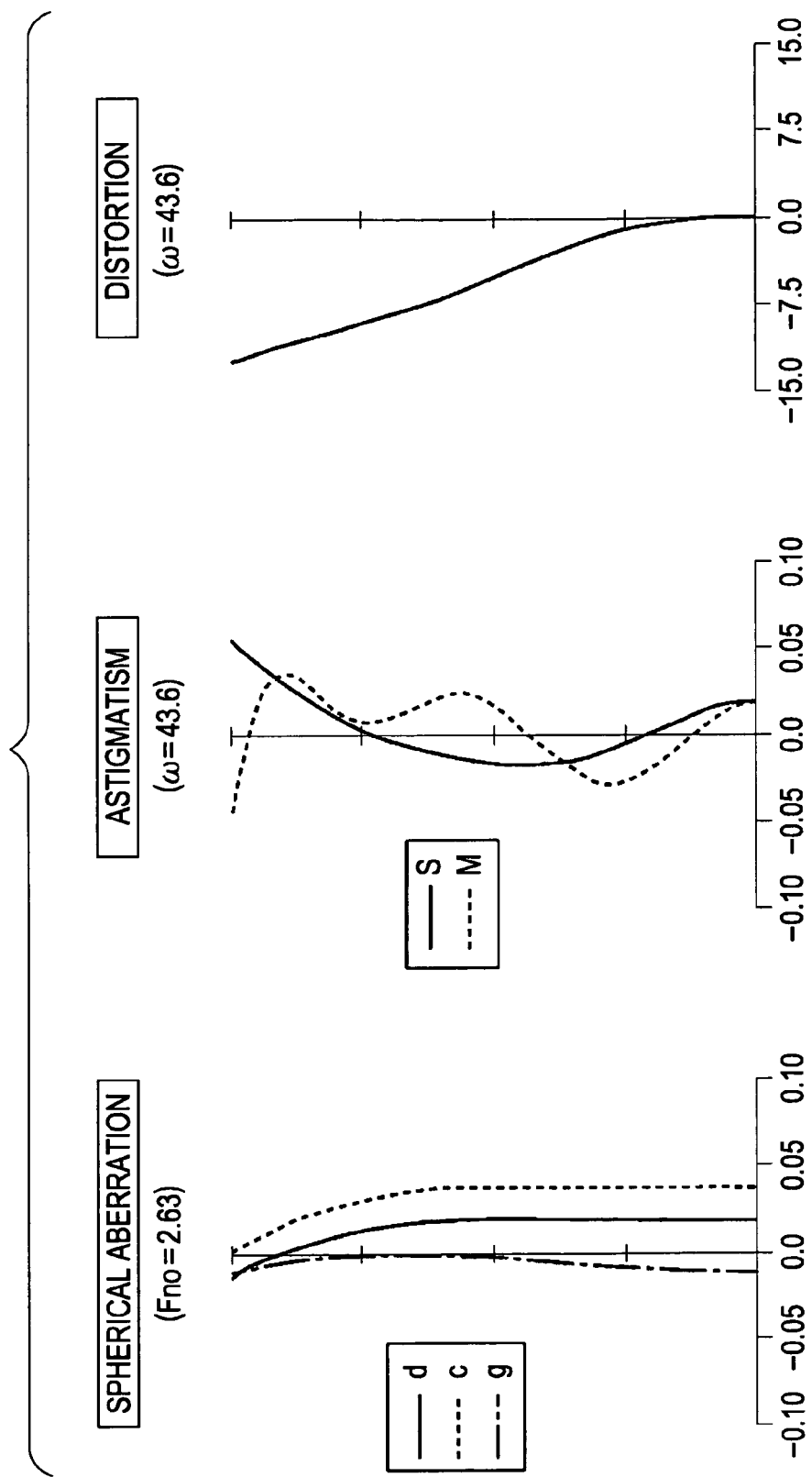
FIG. 7 shows property curves illustrating aberrations in a wide-angle end state according to the Numerical Embodiment 2.
Figure 8:
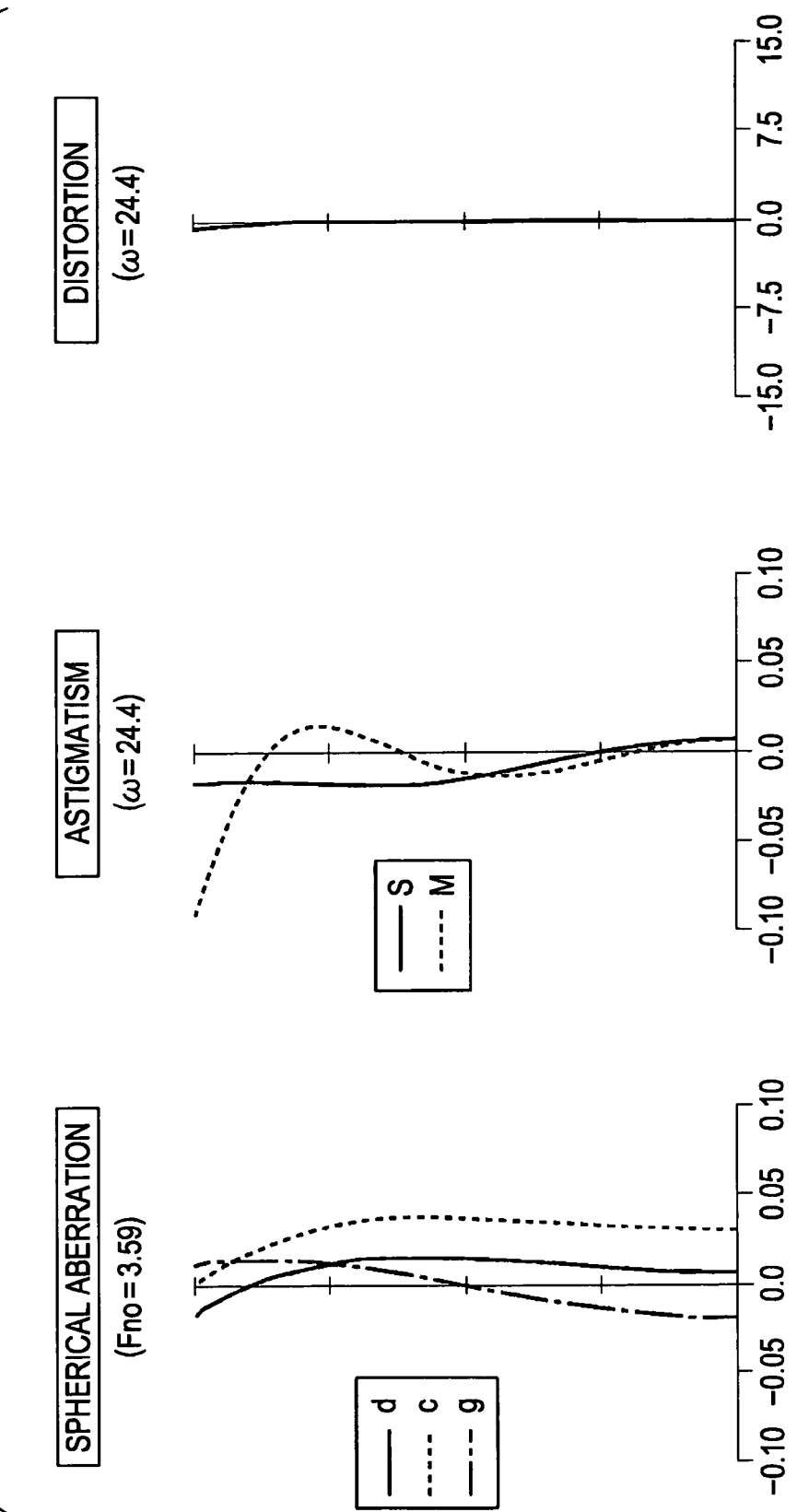
FIG. 8 shows property curves illustrating aberrations in an intermediate focal length state according to the Numerical Embodiment 2.
Figure 9:
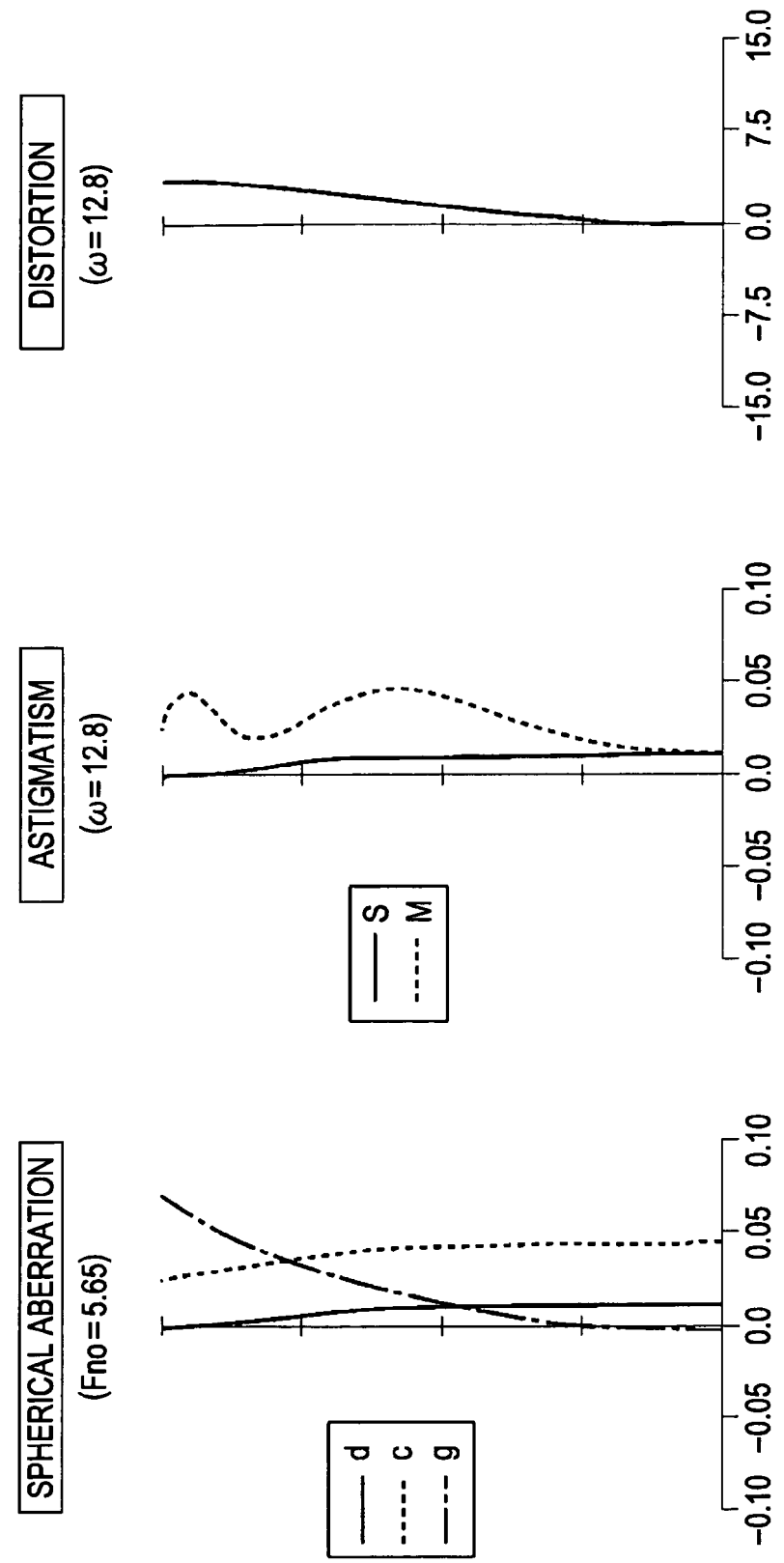
FIG. 9 shows property curves illustrating aberrations in a tele end state according to the Numerical Embodiment 2.

Next, FIG. 7 shows diagrams of aberrations at the wide-angle end state (f=4.30) with the zoom lens 2 according to the Second Numerical Embodiment focused on infinity, FIG. 8 shows diagrams of aberrations at the intermediate focal length state (f=8.60), and FIG. 9 shows diagrams of aberrations at the tele end state (f=17.20). In FIGS. 7 through 9, the spherical aberration diagrams illustrate d line (wavelength 587.6 nm) values with solid lines, c line (wavelength 656.3 nm) values with dotted lines, and g line (wavelength 435.8 nm) values with dash-dotted lines.

Also, in FIGS. 7 through 9, the astigmatism diagrams show sagittal image plane values with solid lines, and meridional image plane values with dotted lines. As can be seen from the aberration diagrams, with the zoom lens 2 according to the Second Numerical Embodiment, aberrations are corrected well from the wide-angle end state to the tele end state, exhibiting excellent image-forming performance.

2-3. Third Numerical Embodiment

Figure 10:
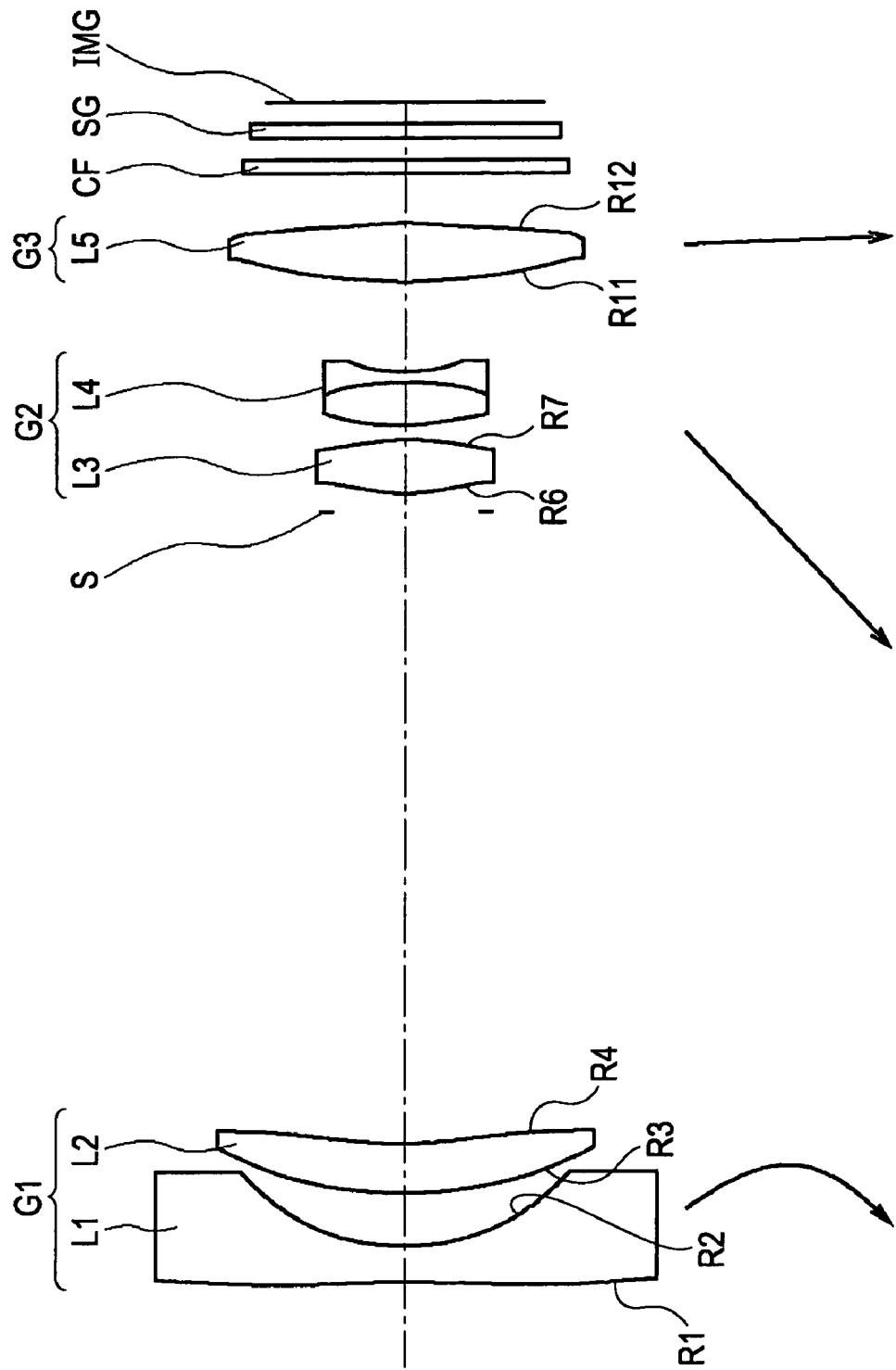
FIG. 10 is a schematic cross-sectional line drawing illustrating the configuration of a zoom lens according to a Numerical Embodiment 3.

In FIG. 10, reference numeral 3 denotes a zoom lens according to the Third Numerical Embodiment, configured overall of a first lens group G1 having negative refractive power, a second lens group G2 having positive refractive power, and a third lens group G3 having positive refractive power, in that order from the object side.

The zoom lens 3 is configured such that, at the time of changing power from the wide-angle end state to the tele end state, the first lens group G1 moves such that air space between the first lens group G1 and the second lens group G2 decreases, and air space between the second lens group G2 and the third lens group G3 increases, and the second lens group G2 moves toward the object side.

The first lens group G1 includes, in order from the object side toward the image side, a first lens L1 which is a biconcave lens of which both faces are formed aspherically, and a second lens L2 which is a positive meniscus lens of which the face facing the object side is formed aspherically, with the convex face facing the object side.

The second lens group G2 includes, in order from the object side, a third lens L3 which is a biconvex lens of which both faces are formed aspherically, and a fourth lens L4 which is a cemented lens of a biconvex lens and a biconcave lens. The third lens group G3 is configured of a fifth lens L5 which is a biconvex lens of which both faces are formed aspherically.

With the zoom lens 3, an aperture diaphragm S is positioned nearby the second lens group G2, at the object side thereof, and a cut filter CF and seal glass SG are positioned between the third lens group G3 and the image plane IMG.

Tables 7 through 9 give the values of the Third Numerical Embodiment of the present invention. Note that of the values for the Third Numerical Embodiment, Fno is the F-number, f is the focal length, and ω is the half-angle. Also, Face No. is a face No. indicating which face in order from the object side toward the image side, R is the paraxial curvature radius corresponding to Face No., and D is the interfacial spacing on the axis between a face corresponding to Face No. and the face adjacent thereto. Further, nd is the d line refractive index of the material making up the lens having the face corresponding to Face No., and vd is the d line Abbe's number of the material making up the lens having the face corresponding to Face No. Moreover, "ASP" means that the face is aspherical, and "INF" means that the curvature of the face is infinite.

TABLE 7

| Face No. | R | D | Nd | vd |
|---|---|---|---|---|
| 1 | −22.529 (ASP) | 1.050 | 1.85135 | 40.1 |
| 2 | 7.314 (ASP) | 2.150 | | |
| 3 | 8.670 (ASP) | 1.700 | 2.00178 | 19.3 |
| 4 | 15.400 (ASP) | D4 | | |
| 5 | Aperture | 0.000 | | |
| 6 | 5.872 (ASP) | 1.900 | 1.61881 | 63.9 |
| 7 | −9.400 (ASP) | 0.283 | | |
| 8 | 10.353 | 1.200 | 1.83481 | 42.7 |
| 9 | −18.052 | 0.400 | 1.71736 | 29.5 |
| 10 | 3.457 | D10 | | |
| 11 | 28.430 (ASP) | 1.850 | 1.61881 | 63.9 |
| 12 | −13.180 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

With the zoom lens 3, the object side face of the first lens L1 of the first lens group G1 (R1), the image side face of the first lens L1 (R2), the object side face of the second lens L2 of the first lens group G1 (R3), the image side face of the second lens L2 (R4), the object side face of the third lens L3 of the second lens group G2 (R6), the image side face of the third lens L3 (R7), the object side face of the fifth lens L5 of the third lens group G3 (R11), and the image side face of the fifth lens L5 (R12), are formed aspherically.

The 4th order, 6th order, 8th order, and 10th order aspherical coefficients A4, A6, A8, and A10 of the aspheric surfaces of the zoom lens 3 are shown in Table 8 along with their conical constants K. Here, the term "E-i" is an exponential notation with a base of 10, i.e., $10^{-i}$, so "0.12345E−05" would represent "0.12345×$10^{-5}$".

Table 9 shows the variable spacing for each interfacial spacing in the Third Numerical Embodiment at the wide-angle end state (focal length f=3.71), intermediate focal length state (focal length f=7.99), and the tele end state (focal length f=17.47), along with the F-numbers Fno and half-angles ω thereof.

TABLE 9

| | Fno | | |
|---|---|---|---|
| | 2.58 | 3.61 | 6.10 |
| f | 3.71 | 7.99 | 17.47 |
| ω | 47.82 | 26.01 | 12.28 |
| D4 | 17.300 | 5.857 | 0.897 |
| D10 | 3.627 | 8.362 | 19.833 |
| D12 | 2.001 | 2.314 | 1.900 |

Thus, the zoom lens 3 according to the Third Numerical Embodiment achieves a zoom factor of 4.7 with a half-angle of 47° or greater, thereby realizing wide angle and high zoom power.

Figure 11:
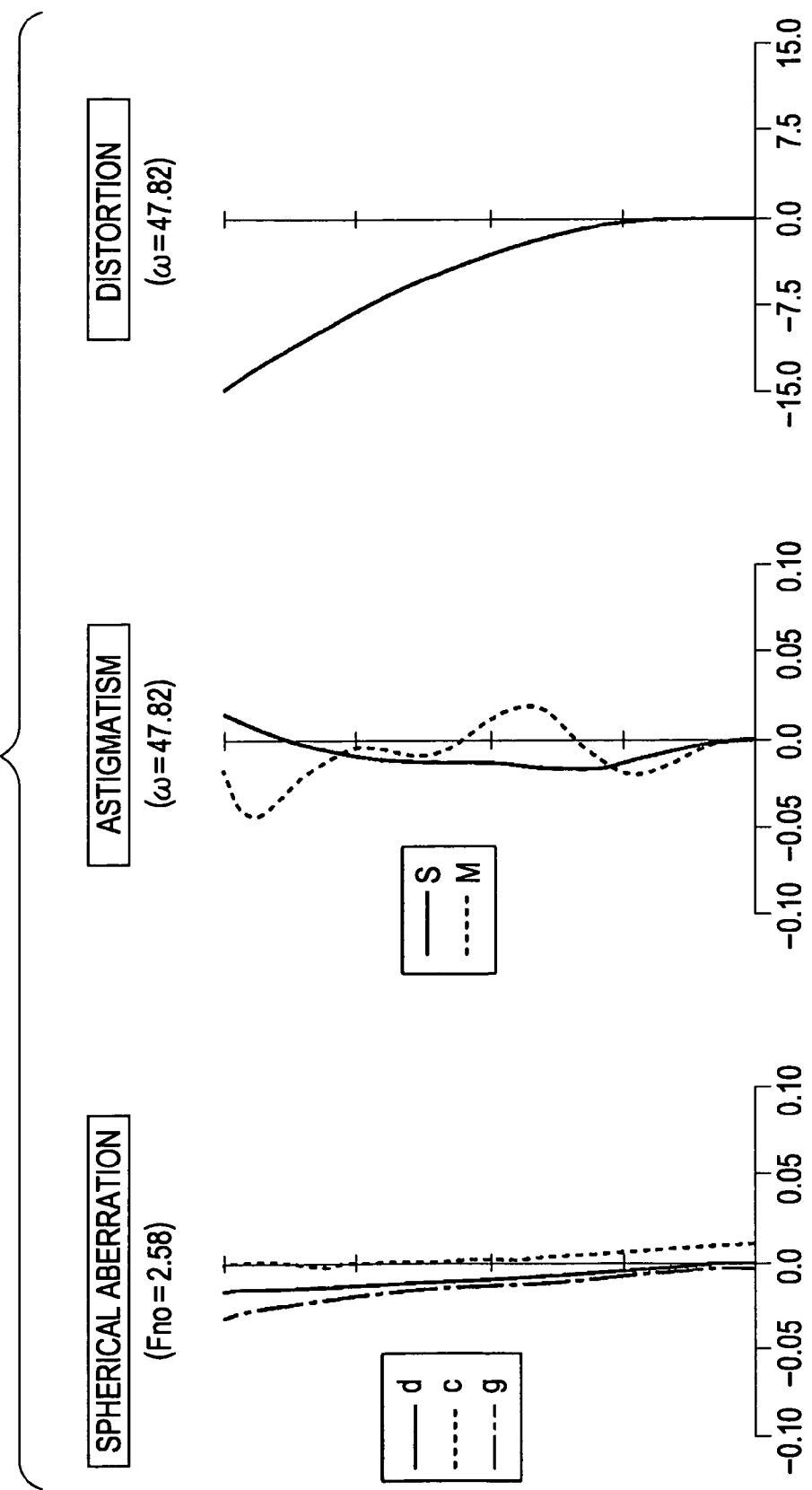
FIG. 11 shows property curves illustrating aberrations in a wide-angle end state according to the Numerical Embodiment 3.
Figure 12:
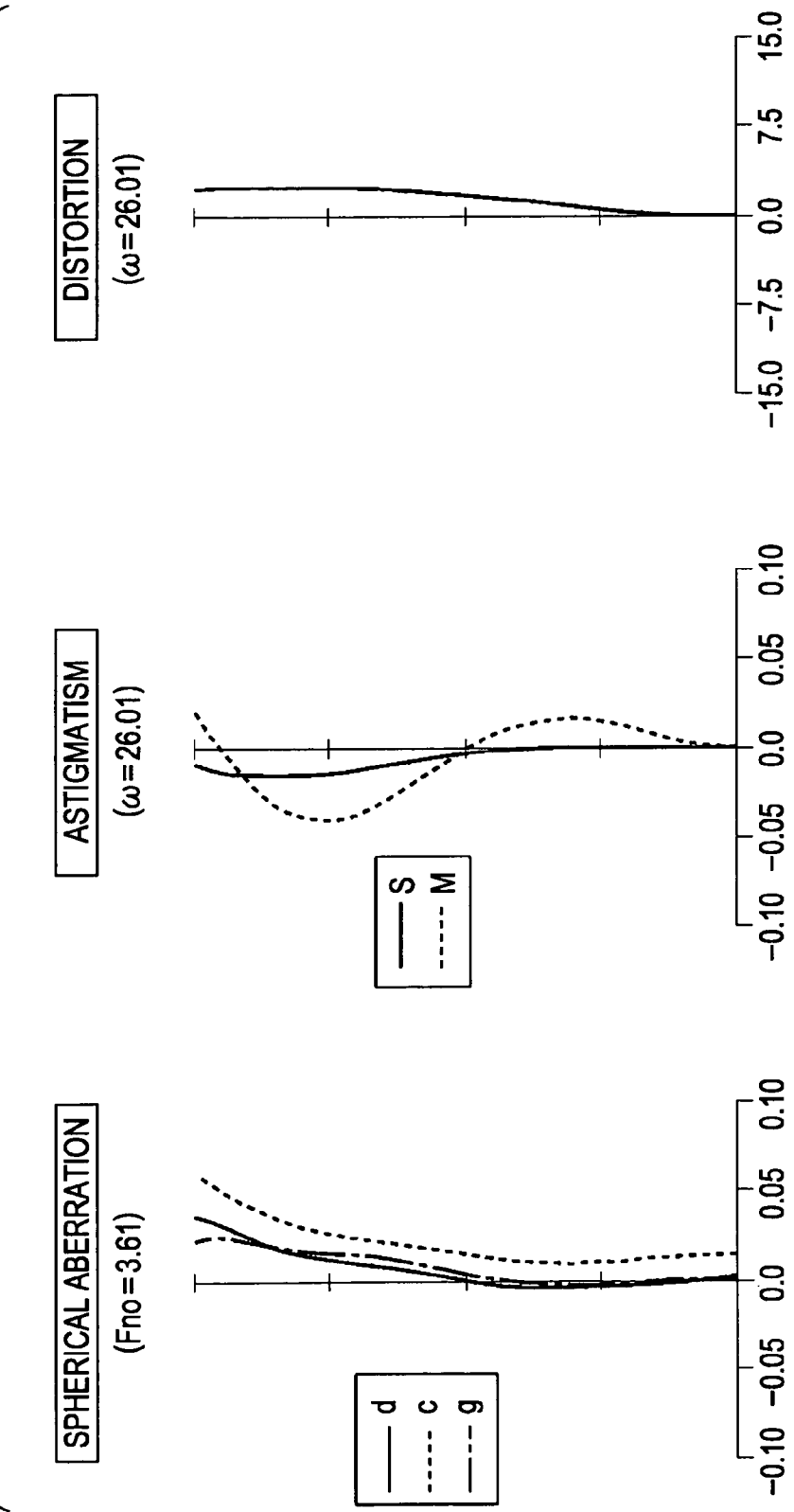
FIG. 12 shows property curves illustrating aberrations in an intermediate focal length state according to the Numerical Embodiment 3.
Figure 13:
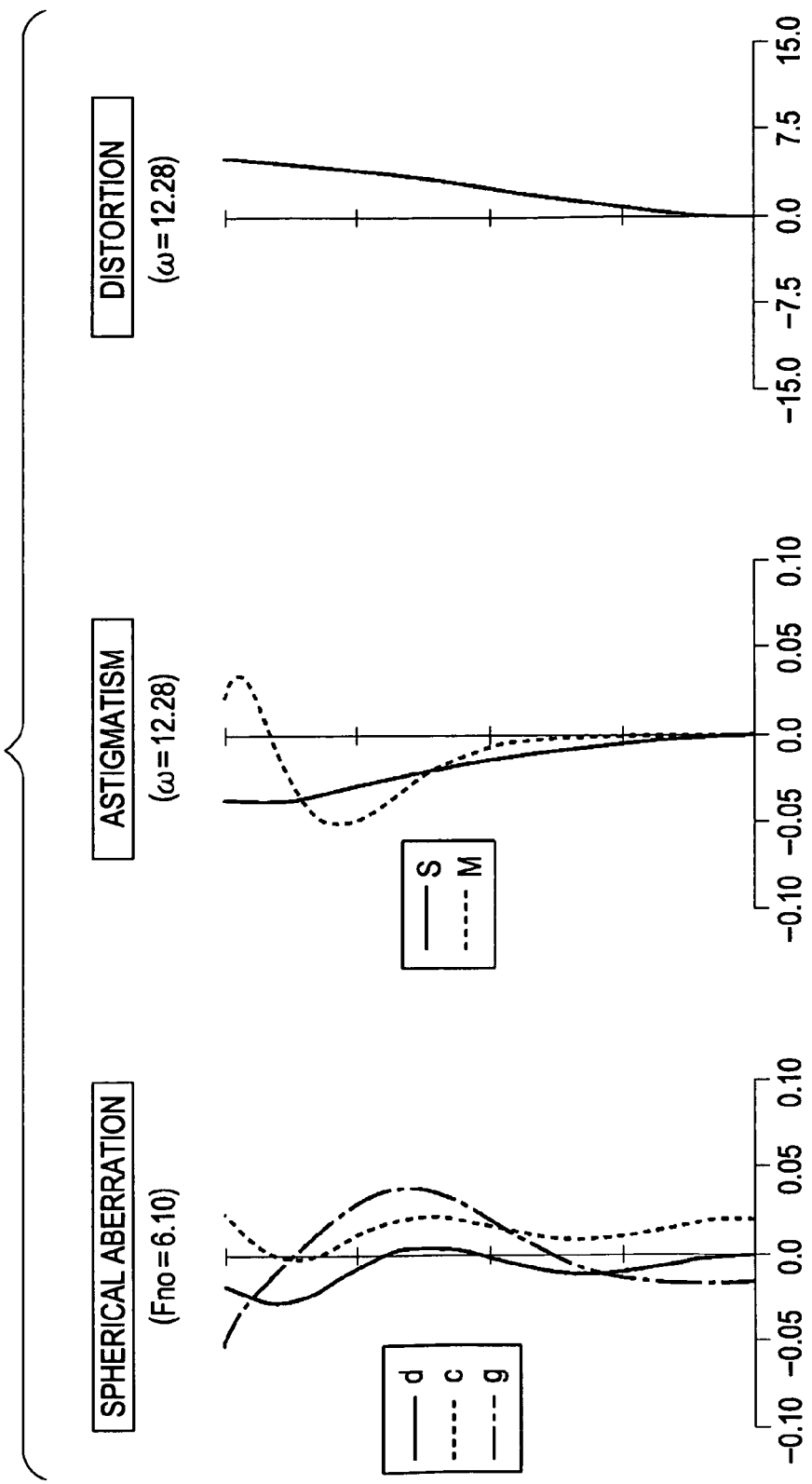
FIG. 13 shows property curves illustrating aberrations in a tele end state according to the Numerical Embodiment 3.

Next, FIG. 11 shows diagrams of aberrations at the wide-angle end state (f=3.71) with the zoom lens 3 according to the Third Numerical Embodiment focused on infinity, FIG. 12 shows diagrams of aberrations at the intermediate focal length state (f=7.99), and FIG. 13 shows diagrams of aberrations at the tele end state (f=17.47). In FIGS. 11 through 13, the spherical aberration diagrams illustrate d line (wavelength 587.6 nm) values with solid lines, c line (wavelength 656.3 nm) values with dotted lines, and g line (wavelength 435.8 nm) values with dash-dotted lines.

Also, in FIGS. 11 through 13, the astigmatism diagrams show sagittal image plane values with solid lines, and meridional image plane values with dotted lines. As can be seen from the aberration diagrams, with the zoom lens 3 according to the Third Numerical Embodiment, aberrations are corrected well from the wide-angle end state to the tele end state, exhibiting excellent image-forming performance.

2-4. Fourth Numerical Embodiment

Figure 14:
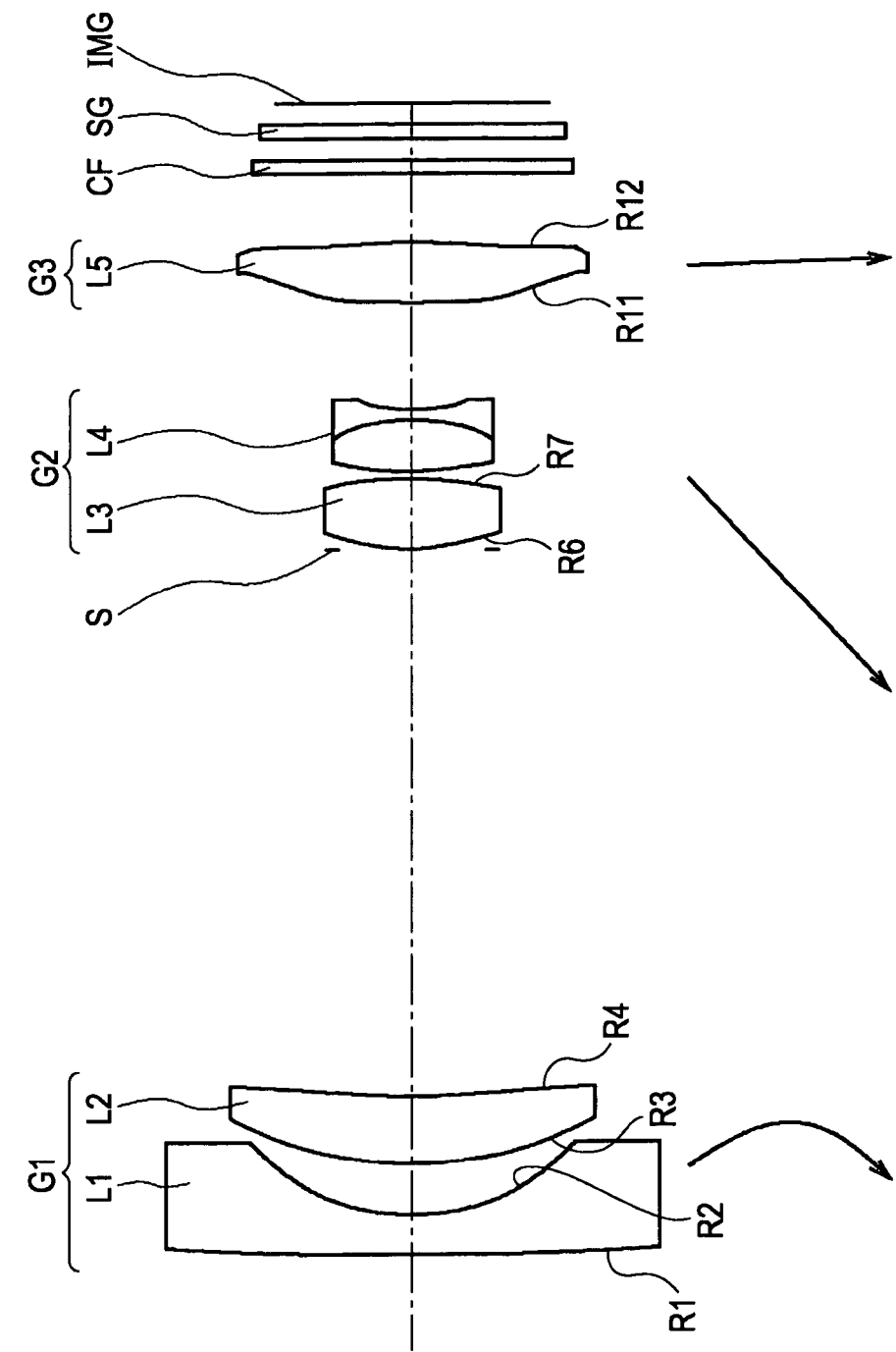
FIG. 14 is a schematic cross-sectional line drawing illustrating the configuration of a zoom lens according to a Numerical Embodiment 4.

In FIG. 14, reference numeral 4 denotes a zoom lens according to the Fourth Numerical Embodiment, configured overall of a first lens group G1 having negative refractive power, a second lens group G2 having positive refractive

TABLE 8

| Face No. | K | A4 | A6 | A8 | A10 |
|---|---|---|---|---|---|
| 1 | 0.00000E+00 | 1.37791E−03 | −2.89953E−05 | 2.80757E−07 | −1.15140E−09 |
| 2 | 0.00000E+00 | −1.50727E−04 | 9.45084E−05 | −3.25000E−06 | 2.76119E−08 |
| 3 | 0.00000E+00 | −1.46419E−03 | 5.68628E−05 | −1.61015E−06 | 1.86880E−08 |
| 4 | 0.00000E+00 | −9.41080E−04 | 2.86502E−05 | −9.85184E−07 | 1.44594E−08 |
| 6 | 0.00000E+00 | −2.35983E−03 | −1.99992E−04 | −1.10183E−06 | −3.74296E−06 |
| 7 | 0.00000E+00 | −1.09092E−03 | −1.46710E−04 | −1.80861E−05 | −3.06098E−07 |
| 11 | 0.00000E+00 | 1.12662E−03 | −7.58282E−05 | 3.71295E−06 | −8.08267E−08 |
| 12 | 0.00000E+00 | 2.26890E−03 | −1.34052E−04 | 5.66336E−06 | −1.10409E−07 |

With the zoom lens 3, the interfacial spacing D4 between the first lens group G1 and the diaphragm, the interfacial spacing D10 between the second lens group G2 and the third lens group G3, and the interfacial spacing D12 between the third lens group G3 and the cut filter CF, change at the time of changing power between the wide-angle end state and the tele end state.

power, and a third lens group G3 having positive refractive power, in that order from the object side.

The zoom lens 4 is configured such that, at the time of changing power from the wide-angle end state to the tele end state, the first lens group G1 moves such that air space between the first lens group G1 and the second lens group G2 decreases, and air space between the second lens group G2 and the third lens group G3 increases, and the second lens group G2 moves toward the object side.

The first lens group G1 includes, in order from the object side toward the image side, a first lens L1 which is a biconcave lens of which both faces are formed aspherically, and a second lens L2 which is a positive meniscus lens of which the face facing the object side is formed aspherically, with the convex face facing the object side.

The second lens group G2 includes, in order from the object side, a third lens L3 which is a biconvex lens of which both faces are formed aspherically, and a fourth lens L4 which is a cemented lens of a biconvex lens and a biconcave lens. The third lens group G3 is configured of a fifth lens L5 which is a biconvex lens of which both faces are formed aspherically.

With the zoom lens 4, an aperture diaphragm S is positioned nearby the second lens group G2, at the object side thereof, and a cut filter CF and seal glass SG are Positioned between the third lens group G3 and the image plane IMG.

Tables 10 through 12 give the values of the Fourth Numerical Embodiment of the present invention. Note that of the values for the Fourth Numerical Embodiment, Fno is the F-number, f is the focal length, and ω is the half-angle. Also, Face No. is a face No. indicating which face in order from the object side toward the image side, R is the paraxial curvature radius corresponding to Face No., and D is the interfacial spacing on the axis between a face corresponding to Face No. and the face adjacent thereto. Further, nd is the d line refractive index of the material making up the lens having the face corresponding to Face No., and vd is the d line Abbe's number of the material making up the lens having the face corresponding to Face No. Moreover, "ASP" means that the face is aspherical, and "INF" means that the curvature of the face is infinite.

TABLE 10

| Face No. | R | D | Nd | vd |
|---|---|---|---|---|
| 1 | INF (ASP) | 1.005 | 1.85135 | 40.1 |
| 2 | 5.430 (ASP) | 2.422 | | |
| 3 | 10.253 (ASP) | 2.073 | 2.00178 | 19.3 |
| 4 | 20.110 (ASP) | D4 | | |
| 5 | Aperture | 0.000 | | |
| 6 | 6.267 (ASP) | 2.107 | 1.62263 | 58.2 |
| 7 | −10.967 (ASP) | 0.100 | | |
| 8 | 12.578 | 1.293 | 1.88300 | 40.8 |
| 9 | −6.283 | 0.400 | 1.69895 | 30.1 |
| 10 | 3.754 | D10 | | |
| 11 | 17.651 (ASP) | 1.787 | 1.61881 | 63.9 |
| 12 | −18.654 (ASP) | D12 | | |
| 13 | INF | 0.300 | 1.51872 | 64.2 |
| 14 | INF | 0.720 | | |
| 15 | INF | 0.500 | 1.51872 | 64.2 |
| 16 | INF | 0.600 | | |

With the zoom lens 4, the object side face of the first lens L1 of the first lens group G1 (R1), the image side face of the first lens L1 (R2), the object side face of the second lens L2 of the first lens group G1 (R3), the image side face of the second lens L2 (R4), the object side face of the third lens L3 of the second lens group G2 (R6), the image side face of the third lens L3 (R7), the object side face of the fifth lens L5 of the third lens group G3 (R11), and the image side face of the fifth lens L5 (R12), are formed aspherically.

The 4th order, 6th order, 8th order, and 10th order aspherical coefficients A4, A6, A8, and A10 of the aspheric surfaces of the zoom lens 4 are shown in Table 11 along with their conical constants K. Here, the term "E-i" is an exponential notation with a base of 10, i.e., $10^{-i}$, so "0.12345E-05" would represent "$0.12345 \times 10^{-5}$".

TABLE 11

| Face No. | K | A4 | A6 | A8 | A10 |
|---|---|---|---|---|---|
| 1 | 0.00000E+00 | 1.59884E−04 | −3.72197E−06 | 7.91757E−08 | −6.20424E−10 |
| 2 | −8.12109E−01 | −2.81792E−04 | 5.87018E−05 | −2.39167E−06 | 4.42154E−08 |
| 3 | 2.10615E+00 | −6.55595E−04 | 2.96301E−05 | −1.37344E−06 | 6.73062E−09 |
| 4 | 1.20906E+01 | −4.78671E−04 | 2.28519E−05 | −1.42379E−06 | 1.25900E−08 |
| 6 | 0.00000E+00 | −1.87629E−03 | −1.24179E−04 | 6.58784E−06 | −1.88322E−06 |
| 7 | 0.00000E+00 | −2.42967E−04 | −1.73790E−04 | 2.38709E−05 | −3.46370E−06 |
| 11 | 0.00000E+00 | 1.75855E−03 | −1.22088E−04 | 5.57392E−06 | −1.26236E−07 |
| 12 | 0.00000E+00 | 3.05623E−03 | −1.77526E−04 | 6.43656E−06 | −1.28821E−07 |

With the zoom lens 4, the interfacial spacing D4 between the first lens group G1 and the diaphragm S, the interfacial spacing D10 between the second lens group G2 and the third lens group G3, and the interfacial spacing D12 between the third lens group G3 and the cut filter CF, change at the time of changing power between the wide-angle end state and the tele end state.

Table 12 shows the variable spacing for each interfacial spacing in the Fourth Numerical Embodiment at the wide-angle end state (focal length f=3.71), intermediate focal length state (focal length f=7.22), and the tele end state (focal length f=14.10), along with the F-numbers Fno and half-angles ω thereof.

TABLE 12

| | Fno | | |
|---|---|---|---|
| | 2.89 | 3.80 | 5.83 |
| f | 3.71 | 7.22 | 14.10 |
| ω | 47.82 | 28.37 | 15.46 |
| D4 | 15.179 | 5.270 | 0.826 |
| D10 | 4.014 | 7.717 | 16.597 |
| D12 | 1.900 | 2.374 | 1.900 |

Thus, the zoom lens 4 according to the Fourth Numerical Embodiment achieves a zoom factor of 3.8 with a half-angle of 47° or greater, thereby realizing wide angle and high zoom power.

Figure 15:
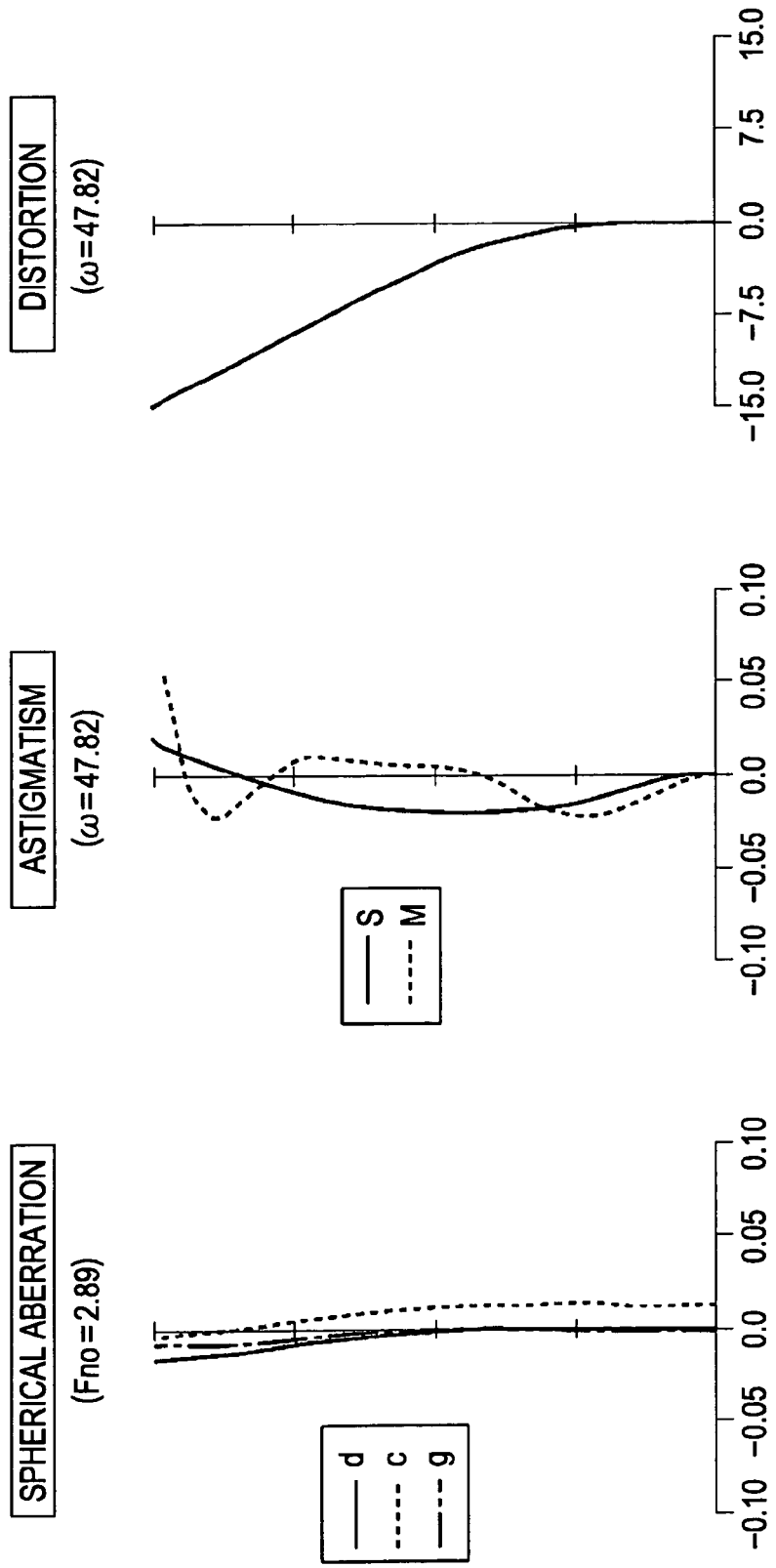
FIG. 15 shows property curves illustrating aberrations in a wide-angle end state according to the Numerical Embodiment 4.
Figure 16:
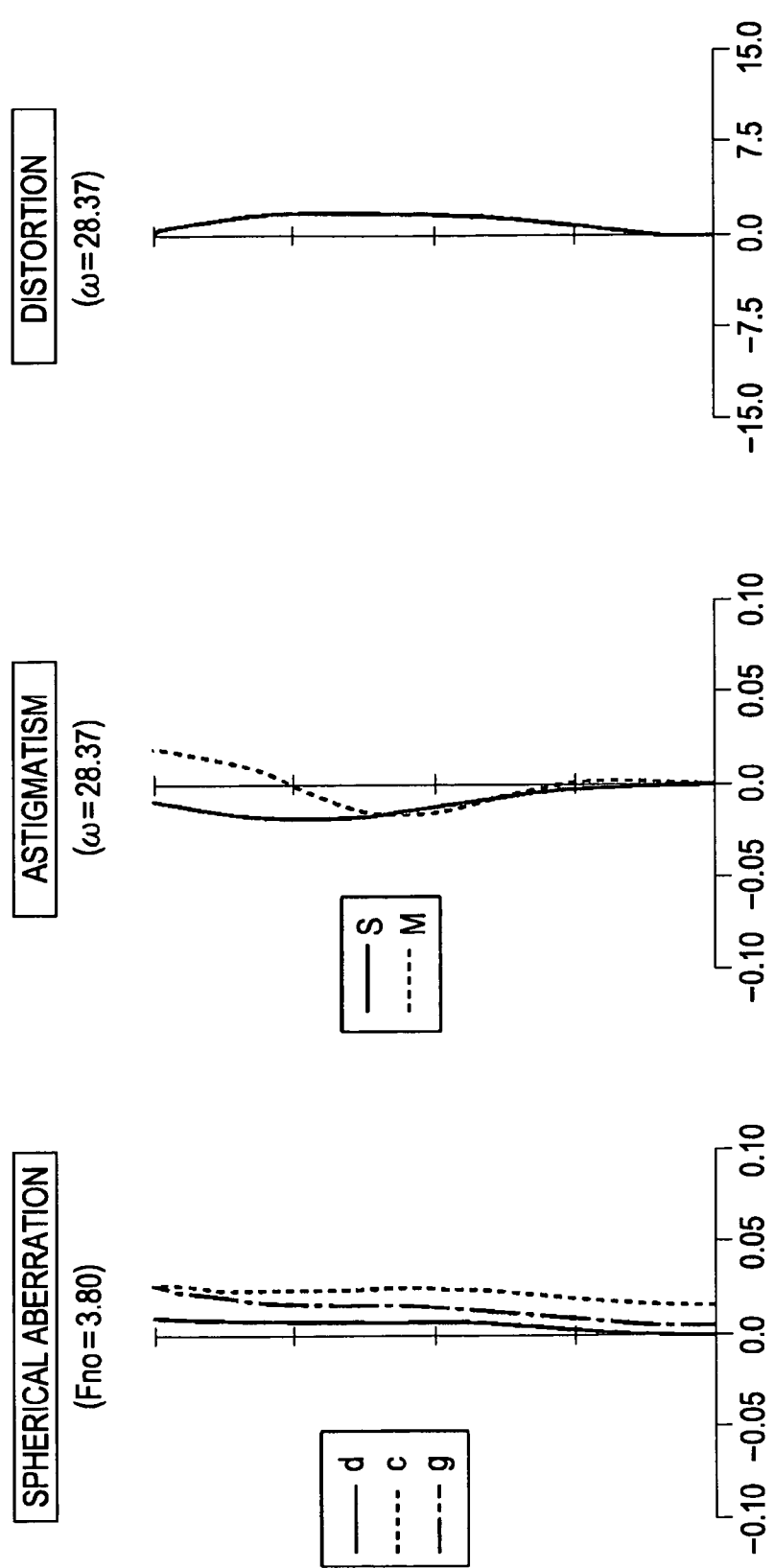
FIG. 16 shows property curves illustrating aberrations in an intermediate focal length state according to the Numerical Embodiment 4.
Figure 17:
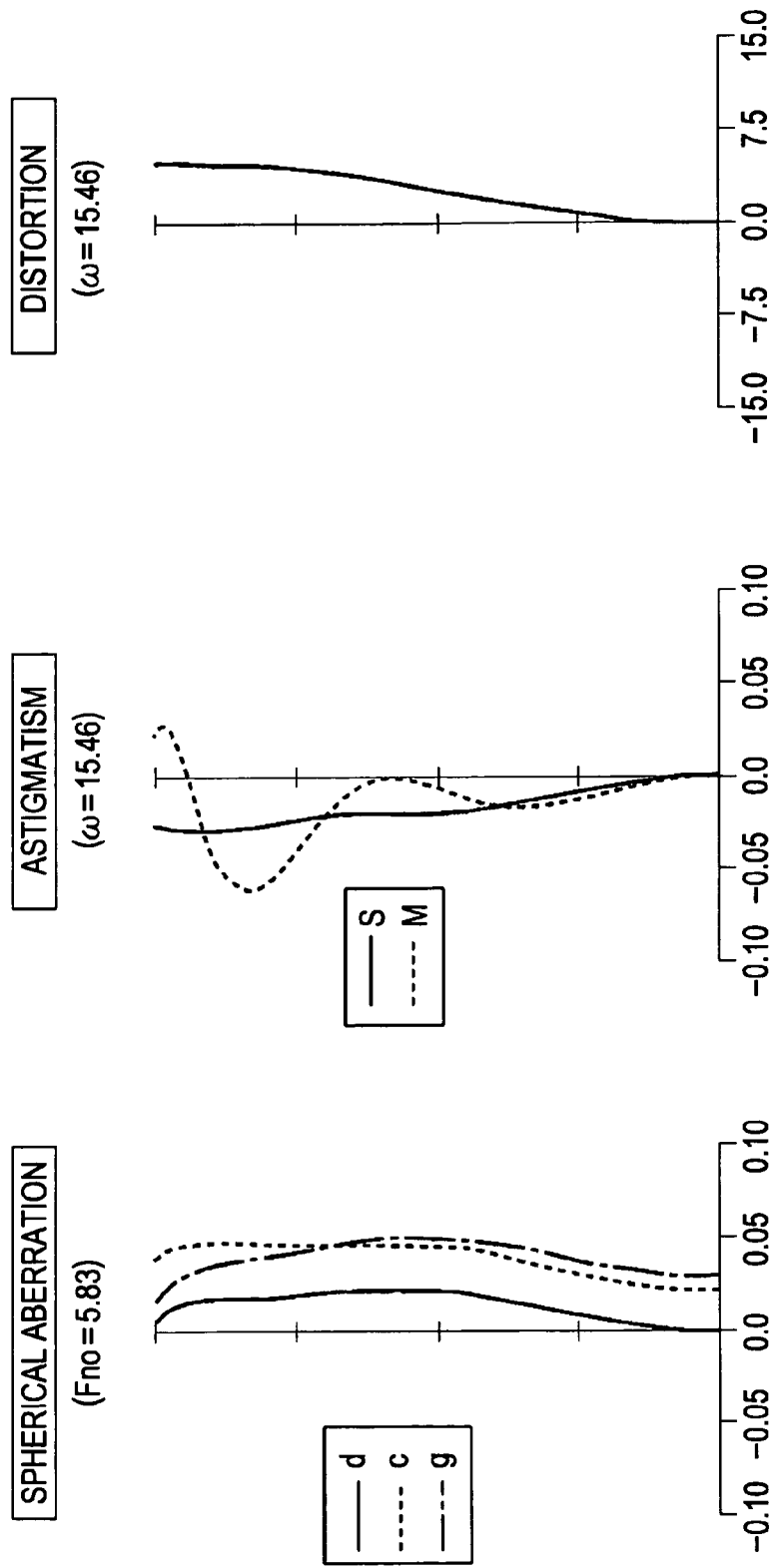
FIG. 17 shows property curves illustrating aberrations in a tele end state according to the Numerical Embodiment 4.

Next, FIG. 15 shows diagrams of aberrations at the wide-angle end state (f=3.71) with the zoom lens 4 according to the Fourth Numerical Embodiment focused on infinity, FIG. 16 shows diagrams of aberrations at the intermediate focal length state (f=7.22), and FIG. 17 shows diagrams of aberrations at the tele end state (f=14.10). In FIGS. 15 through 17, the spherical aberration diagrams illustrate d line (wavelength 587.6 nm) values with solid lines, c line (wavelength 656.3 nm) values with dotted lines, and g line (wavelength 435.8 nm) values with dash-dotted lines.

Also, in FIGS. 15 through 17, the astigmatism diagrams show sagittal image plane values with solid lines, and meridional image plane values with dotted lines. As can be seen from the aberration diagrams, with the zoom lens 4 according to the Fourth Numerical Embodiment, aberrations are corrected well from the wide-angle end state to the tele end state, exhibiting excellent image-forming performance.

2-5. Values Corresponding to the Conditional Expressions

Next, Table 13 shows values and conditions corresponding to the Conditional Expressions (1) through (5) for the zoom lenses 1 through 4 shown in the First through Fourth Numerical Embodiments.

TABLE 13

|  | Zoom Lens 1 | Zoom Lens 2 | Zoom Lens 3 | Zoom Lens 4 |
|---|---|---|---|---|
| fw | 4.300 | 4.300 | 3.710 | 3.710 |
| f1 | −10.457 | −13.351 | −11.127 | −11.354 |
| f11 | −7.415 | −7.462 | −6.340 | −6.344 |
| f12 | 19.464 | 20.024 | 18.657 | 17.358 |
| D1 | 4.70 | 4.65 | 5.50 | 4.90 |
| $\beta_{2T}$ | −2.022 | −1.710 | −1.822 | −2.133 |
| Zr | 5.0 | 4.0 | 3.8 | 4.71 |
| Conditional Expression (1) | 3.206 | 3.105 | 2.935 | 3.063 |
| Conditional Expression (2) | 1.41 | 1.50 | 1.71 | 1.53 |
| Conditional Expression (3) | 0.38 | 0.37 | 0.34 | 0.37 |
| Conditional Expression (4) | 1.09 | 1.08 | 1.48 | 1.32 |
| Conditional Expression (5) | 0.90 | 0.85 | 0.93 | 0.98 |

It can be seen from Table 13 that in accordance with Conditional Expression (1), |f1/fw| has a minimum of 2.935 and a maximum of 3.206, thereby satisfying the numerical value range of Conditional Expression (1). It can also be seen that in accordance with Conditional Expression (2), |f12/f1| has a minimum of 1.41 and a maximum of 1.71, thereby satisfying the numerical value range of Conditional Expression (2). It can further be seen that in accordance with Conditional Expression (3), |f11/f12| has a minimum of 0.34 and a maximum of 0.38, thereby satisfying the numerical value range of Conditional Expression (3). It can further be seen that in accordance with Conditional Expression (4), D1/fW| has a minimum of 1.08 and a maximum of 1.48, thereby satisfying the numerical value range of Conditional Expression (4). It can moreover be seen that in accordance with Conditional Expression (5), $|\beta_{2T}/\sqrt{Zr}|$ has a minimum of 0.85 and a maximum of 0.98, thereby satisfying the numerical value range of Conditional Expression (5).

Accordingly, the zoom lenses 1 through 4 in the First through Fourth Numerical Embodiments satisfy all of the Conditional Expressions (1) through (5), and also as shown in the aberration diagrams, the aberrations can be corrected in a well-balanced manner at the wide-angle end state, intermediate focal length state, and tele end state.

3. Configuration of Imaging Apparatus

Next, the configuration of an imaging apparatus according to an embodiment of the present invention will be described. This imaging apparatus includes a zoom lens and an imaging device configured to convert an optical image formed by the zoom lens into electrical signals.

The zoom lens of the imaging apparatus includes a first lens group having negative refractive power, a second lens group having positive refractive power, and a third lens group having positive refractive power, in that order from the object side.

With the imaging apparatus, at the time of changing power from a wide-angle end state to a tele end state, the first lens group moves such that air space between the first lens group and the second lens group decreases, and air space between the second lens group and the third lens group increases, and the second lens group moves toward the object side. The first lens group includes two lenses, which are, in order from the object side toward the image side, a first lens which is a negative lens of which both faces are formed aspherically with the concave face facing the image side, and a second lens which is a positive meniscus lens of which at least one face is formed aspherically with the convex face facing the object side.

With imaging apparatus, both faces of the first lens of the first lens group of the zoom lens, which is a negative lens, are formed aspherically, so as to correct negative aberration and image curvature which markedly occurs in the wide-angle end state when widening the field angle of the zoom lens. Also, at least one face of the second lens of the first lens group which is a positive meniscus lens is formed aspherically, so as to correct, in a balanced manner, distortion and astigmatism at the wide-angle end state which are not completely corrected by the first lens of the first lens group, which is a negative lens.

Also, with the imaging apparatus, at least one face of the second lens of the first lens group of the zoom lens, which is a positive meniscus lens, is formed aspherically, so as to correct spherical aberration well, occurring at a tele end state in the case of a great zoom factor. Accordingly, good aberration correction can be obtained even with a first lens group configured of two lenses, and particularly, with a collapsible telescopic arrangement of a zoom lens for an imaging apparatus, the overall length when storing in a collapsed manner can be reduced.

Note that with the imaging apparatus, correction of distortion occurring in the zoom lens is preferably performed by image processing within the imaging apparatus. This allows a lens to correct distortion to be eliminated from the zoom lens, thereby enabling reduction in size and high power of the zoom lens.

4. Configuration of Digital Still Camera

Figure 18:
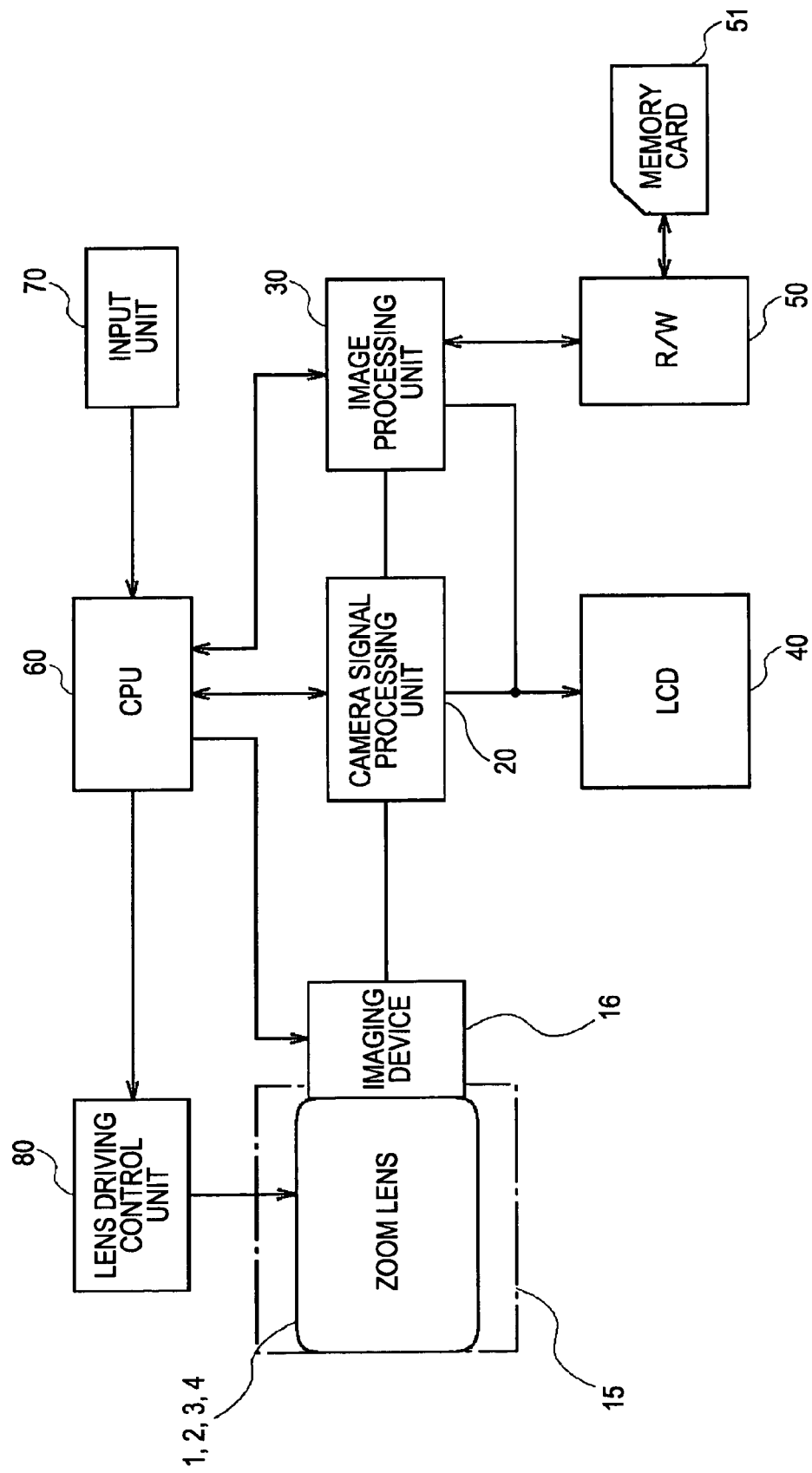
FIG. 18 is a schematic block diagram illustrating the configuration of a digital still camera serving as an imaging apparatus.

Next, the configuration of a digital still camera serving as an embodiment of the imaging apparatus will be described in detail. As shown in FIG. 18, a digital still camera 100 including any one of the above-described zoom lenses 1 through 4 also includes a camera block 15 to handle imaging functions, and a camera signal processing unit 20 to perform signal processing on image signals imaged by the camera block 15, such as analog/digital conversion processing and so forth.

Also, the digital still camera 100 further includes an image processing unit 30 for performing recording/reproduction processing of image signals and so forth, an LCD (Liquid Crystal Display) 40 to display taken images and so forth, and a reader/writer 50 to read from and write to a memory card 51. Further, the digital still camera 100 also includes a CPU (Central Processing Unit) 60 which controls the entire camera, an input unit 70 for inputting operations by the user, and a lens driving control unit 80 for controlling driving of the lenses within the camera block 15.

The camera block 15 has a configuration wherein an optical system including the zoom lens 1 (or 2, 3, or 4), and an imaging device 16 which is a CCD (Charge Coupled Device)

sensor or CMOS (Complementary Metal Oxide Semiconductor) sensor or the like, are combined.

The camera signal processing unit 20 is configured to perform signal processing on output signals from the imaging device 16, such as conversion into digital signals, removal of noise, image quality correction, conversion processing to brightness/color-difference signals, and so forth.

The image processing unit 30 is configured to perform compression encoding and decompression decoding processing of image signals based on predetermined image data formats, conversion processing of data specifications, such as resolution, and so forth.

The memory card 51 is configured of semiconductor memory and is detachable. The reader/writer 50 writes image data encoded by the image processing unit 30 to the memory card 51, and reads out the image data recorded in the memory card 51.

The CPU 60 centrally controls each of the circuit blocks within the digital still camera 100, and is configured so as to control the circuit blocks based on instruction input signals from the input unit 70, and so forth.

The input unit 70 is configured of, for example, a shutter release button for shutter operations, a selection switch for selecting an operation mode, and so forth, and outputs instruction input signals corresponding to user operations to the CPU 60.

The lens driving control unit 80 controls unshown motors or the like for driving lenses within the zoom lens 1 (or 2, 3, or 4) based on control signals from the CPU 60.

Next, the operations of the digital still camera 100 will be briefly described. With the digital still camera 100, in a photography standby state, image signals imaged by the camera block 15 are output to the LCD 40 via the camera signal processing unit 20 under control of the CPU 60, thereby displaying the image signals as camera through images.

With the digital still camera 100, upon instruction input signals for zooming being input from the input unit 70, the CPU 60 outputs control signals to the lens driving control unit 80, and predetermined lenses within the zoom lens 1 (or 2, 3, or 4) are moved under control of the lens driving control unit 80.

With the digital still camera 100, upon an unshown shutter of the camera block 15 being operated by instruction input signals from the input unit 70, the imaged image signals are output from the camera signal processing unit 20 to the image processing unit 30.

With the image processing unit 30, following performing predetermined compression encoding to the image signals supplied from the camera signal processing unit 20, the image signals are converted to digital data of a predetermined data format, and are written to the memory card 51 by the reader/writer 50.

Note that focusing is performed by driving control of the zoom lens 1 (or 2, 3, or 4) by the lens driving control unit 80 based on control signals from the CPU 60, in the event that the shutter release button is half-pressed for example, or full-pressed for recording.

Also, in the event of reproducing the image data recorded in the memory card 51, the CPU 60 reads the image data from the memory card 51 by way of the reader/writer 50 in accordance to operations to the input unit 70, and following performing decompression decoding by way of the image processing unit 30, outputs to the LCD 40. The LCD 40 is configured to display reproduced images based on the image data subjected to the decompression decoding processing by the image processing unit 30.

It should be noted that while application of the imaging apparatus to a digital still camera has been described with the present embodiment, the imaging apparatus can be applied to other imaging apparatuses such as digital video cameras or the like, for example.

5. Other Embodiments

It should be noted that the specific shapes, configurations, and numerical values, of the components illustrated in the above-described embodiment and First through Fourth Numerical Embodiments are only exemplary illustrations of carrying out embodiments of the present invention, and should not be interpreted restrictively regarding the technical scope of the present invention. For example, while specific numerical values have been shown in tables 1 through 3 based on the First through Fourth Numerical Embodiments, the present invention is not restricted to these numerical values, and various other numerical values may be used as long as being in the range of satisfying the Conditional Expressions (1) through (5).

Also, a case has been described with the First through Fourth Numerical Embodiments wherein the entire second lens group G2 is shifted in a direction generally perpendicular to the optical axis, thereby shifting the image with little change in aberration. However, the present invention is not restricted to this arrangement, and the image may be shifted using the first lens group G1 or third lens group G3 instead of the second lens group G2.

Further, while application of the imaging apparatus to the digital still camera 100 has been described above, specific examples of imaging apparatuses are not restricted to this, and can be applied to a wide range of electronic equipment, such as digital video cameras, cellular phones, personal computers in which cameras have been implemented, PDAs with built-in cameras, and so forth.

The present application contains subject matter related to that disclosed in Japanese Priority Patent Application JP 2009-103145 filed in the Japan Patent Office on Apr. 21, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
   a first lens group having negative refractive power;
   a second lens group having positive refractive power; and
   a third lens group having positive refractive power;
   wherein said first, second, and third lens groups are arranged in that order from the object side;
   and wherein, at the time of changing power from a wide-angle end state to a tele end state, said first lens group moves such that air space between said first lens group and said second lens group decreases, and air space between said second lens group and said third lens group increases, and said second lens group moves toward the object side;
   and wherein said first lens group includes two lenses, which are, in order from the object side toward the image side,
      a negative lens of which both faces are formed aspherically with the concave face facing the image side, and a positive meniscus lens of which at least one face is formed aspherically with the convex face facing the object side, satisfying the following Conditional Expression (1)

$$2.8<|f1/fw|<3.3 \quad (1)$$

where f1 represents the focal length of said first lens group, and fw represents the focal length of the entirety in the wide-angle end state.

2. The zoom lens according to claim 1, satisfying the following Conditional Expressions (2) through (4)

$$1.0<|f12/f1|<2.0 \quad (2)$$

$$0.25<|f11/f12|<0.45 \quad (3)$$

$$1.0<D1/fw<1.6 \quad (4)$$

where f11 represents the focal length of a first lens which is said negative lens, f12 represents the focal length of a second lens which is said positive meniscus lens, f1 represents the focal length of said first lens group, D1 represents the thickness of said first lens group on the optical axis, and fw represents the focal length in the wide-angle end state.

3. The zoom lens according to claim 2, satisfying the following Conditional Expression (5)

$$0.80<|\beta_{2T}\sqrt{Zr}|<1.05 \quad (5)$$

where $\beta_{2T}$ represents the horizontal power in said second lens group in the tele end state, and Zr represents the zoom factor from the wide-angle end state to the tele end state.

4. The zoom lens according to claim 3, wherein said second lens group is a cemented lens configured of, in order from the object side toward the image side, a positive lens of which at least the object side face is formed aspherically, with the convex face facing the object side, a positive lens with the convex face facing the object side, and a negative lens with the concave face facing the image side.

5. An imaging apparatus comprising:

a zoom lens; and an imaging device configured to convert an optical image, formed by said zoom lens, into electrical signals;

said zoom lens further including a first lens group having negative refractive power, a second lens group having positive refractive power, and a third lens group having positive refractive power, wherein said first, second, and third lens groups are arranged in that order from the object side;

and wherein, at the time of changing power from a wide-angle end state to a tele end state, said first lens group moves such that air space between said first lens group and said second lens group decreases, and air space between said second lens group and said third lens group increases, and said second lens group moves toward the object side;

and wherein said first lens group includes two lenses, which are, in order from the object side toward the image side, a negative lens of which both faces are formed aspherically with the concave face facing the image side, and a positive meniscus lens of which at least one face is formed aspherically with the convex face facing the object side, satisfying the following Conditional Expression (1)

$$2.8<|f1/fw|<3.3 \quad (1)$$

where f1 represents the focal length of said first lens group, and fw represents the focal length of the entirety in the wide-angle end state.

* * * * *